(12) United States Patent
Byvank et al.

(10) Patent No.: US 10,782,193 B2
(45) Date of Patent: Sep. 22, 2020

(54) HIGH COMMAND FIDELITY ELECTROMAGNETICALLY DRIVEN CALORIMETER

(71) Applicants: UT-Battelle, LLC, Oak Ridge, TN (US); Iowa State University Research Foundation, Inc., Ames, IA (US)

(72) Inventors: Tom Byvank, Knoxville, TN (US); Benjamin S. Conner, Columbus, OH (US); Roger A. Kisner, Knoxville, TN (US); Michael A. McGuire, Knoxville, TN (US); Orlando Rios, Knoxville, TN (US); Michael S. Kesler, Knoxville, TN (US); Gerard M. Ludtka, Oak Ridge, TN (US); Boyd Evans, Sewanee, TN (US); Cajetan Ikenna Niebedim, Ames, IA (US); Ralph William McCallum, Santa Fe, NM (US)

(73) Assignees: UT-Battelle, LLC, Oak Ridge, TN (US); Iowa State University Research Foundation, Inc., Ames, IA (US)

(*) Notice: Subject to any disclaimer, the term of this patent is extended or adjusted under 35 U.S.C. 154(b) by 347 days.

(21) Appl. No.: 15/694,708

(22) Filed: Sep. 1, 2017

(65) Prior Publication Data
US 2018/0058953 A1     Mar. 1, 2018

Related U.S. Application Data

(60) Provisional application No. 62/382,361, filed on Sep. 1, 2016.

(51) Int. Cl.
| | | |
|---|---|---|
| *G01K 3/00* | (2006.01) |
| *G01K 7/00* | (2006.01) |
| *G01K 1/00* | (2006.01) |
| *G01N 25/00* | (2006.01) |
| *G01K 17/00* | (2006.01) |
| *G01K 7/02* | (2006.01) |

(52) U.S. Cl.
CPC ............... *G01K 17/00* (2013.01); *G01K 7/02* (2013.01)

(58) Field of Classification Search
USPC .................. 374/10, 163, 208, 112, 110, 166
See application file for complete search history.

(56) References Cited

U.S. PATENT DOCUMENTS

| | | | |
|---|---|---|---|
| 2002/0012379 A1* | 1/2002 | Kinoshita | G01N 25/486 374/12 |
| 2007/0036198 A1* | 2/2007 | Brcka | G01B 7/105 374/7 |
| 2008/0304542 A1* | 12/2008 | Danley | G01K 17/00 374/31 |
| 2017/0234818 A1* | 8/2017 | Jesme | G01N 27/18 374/54 |

* cited by examiner

*Primary Examiner* — Mirellys Jagan
(74) *Attorney, Agent, or Firm* — Klarquist Sparkman, LLP

(57) ABSTRACT

An example apparatus can comprise an emitter to emit radio frequency radiation, an absorber that changes temperature based on emissions from the emitter, and one or more sensors to measure a temperature difference between a sample and a reference coupled to the absorber.

21 Claims, 18 Drawing Sheets

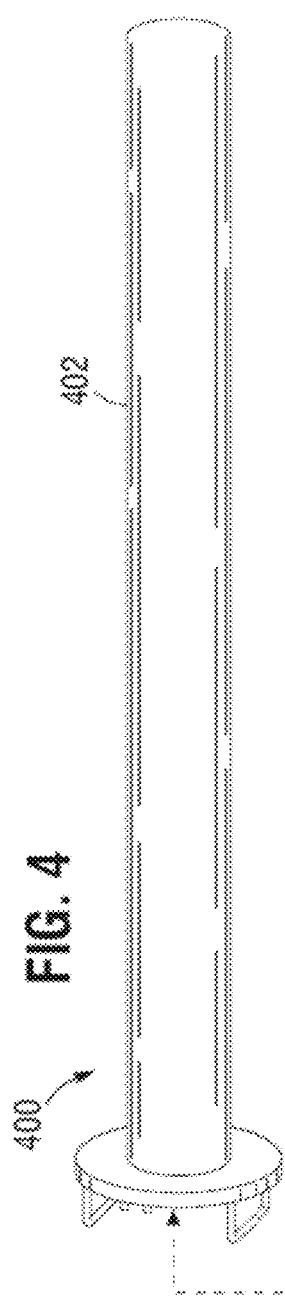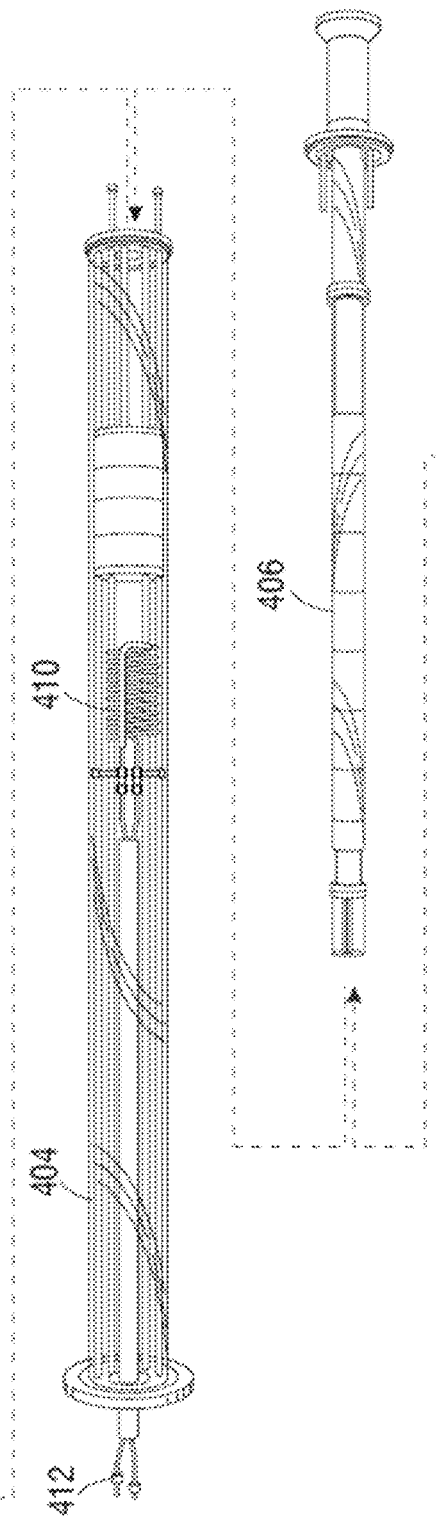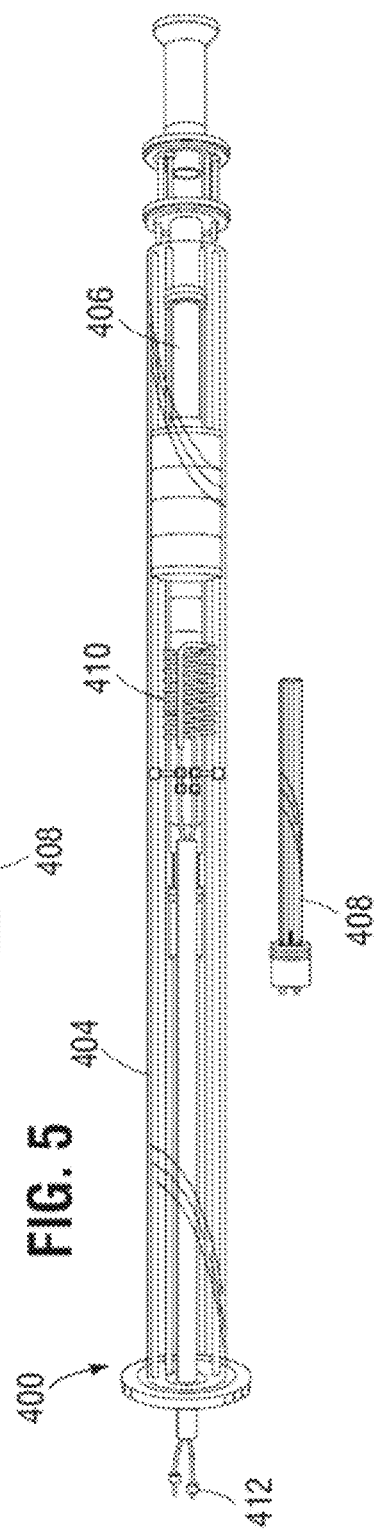

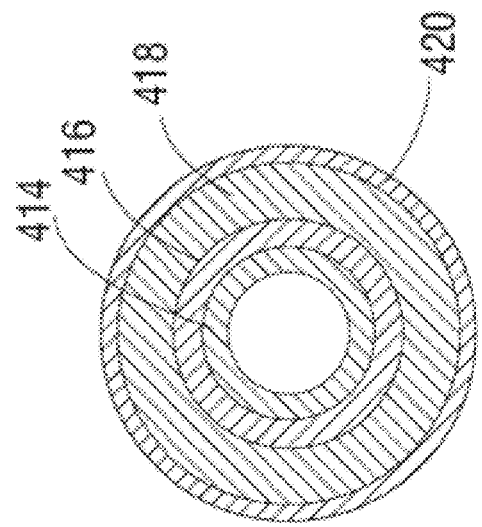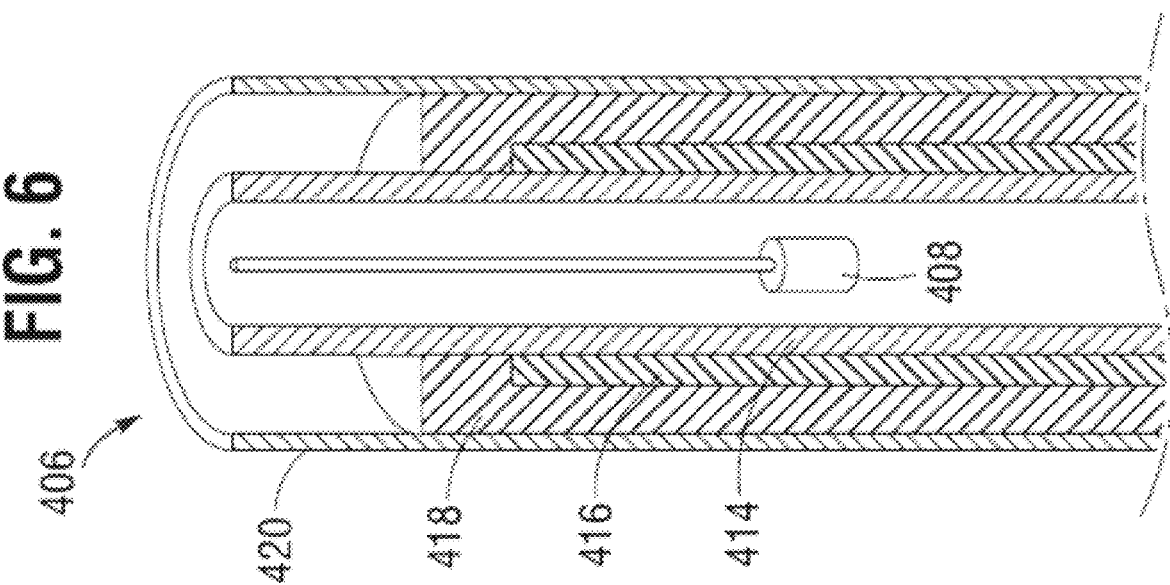

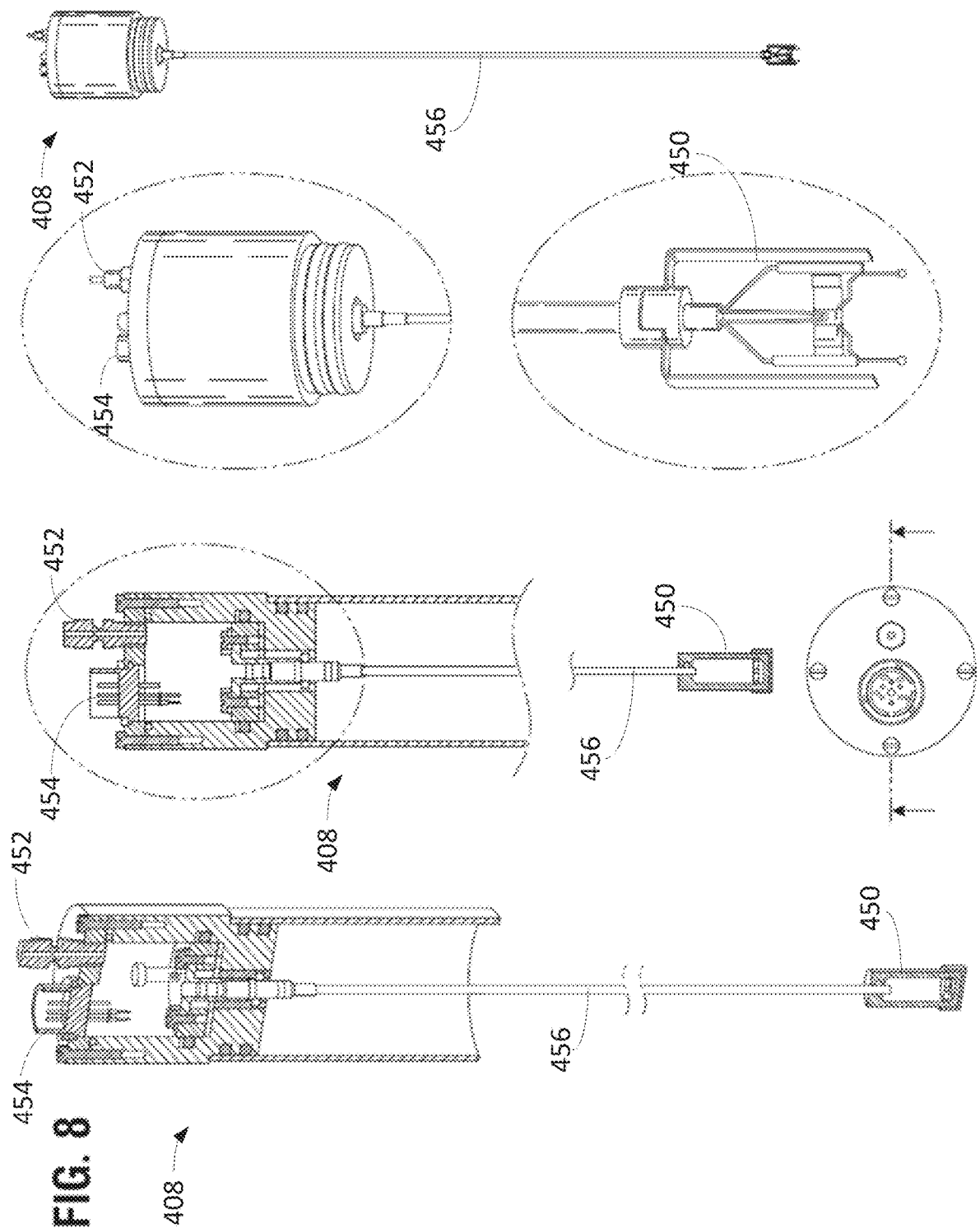

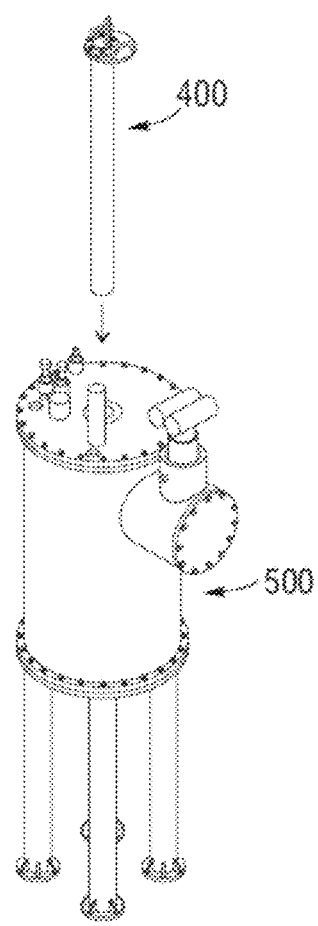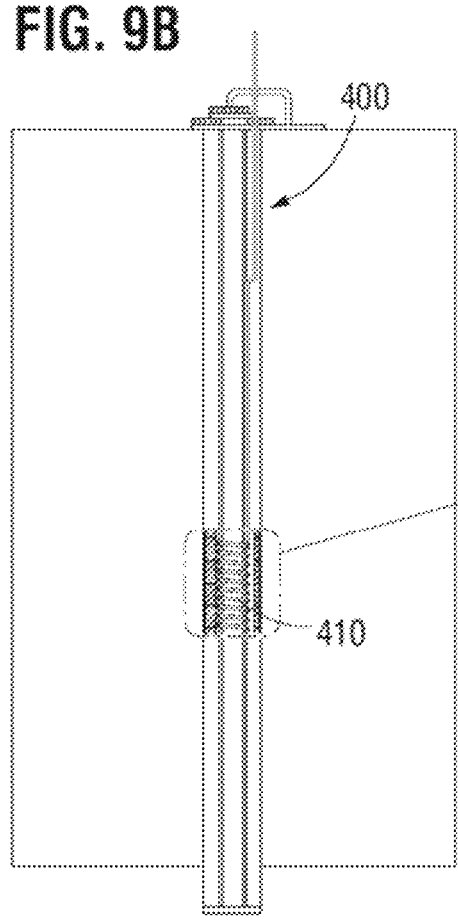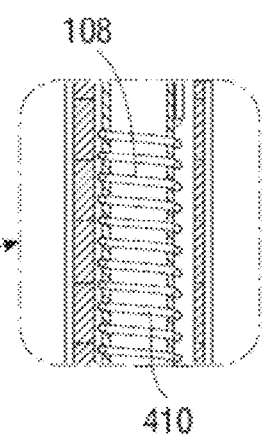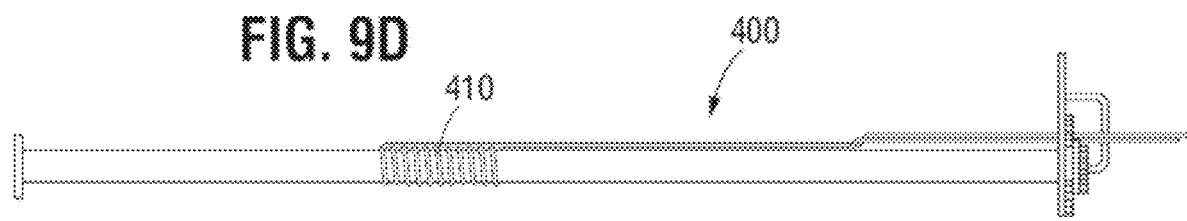

| Thermocouple Type | Seebeck Coefficient | Output at 400 °C | Relative Noise Susceptibility |
|---|---|---|---|
| J (Iron-Constantan)<br>K (Chromel-Alumel)<br>T (Copper-Constantan)<br>N (Nicrosil-Nisil) | 40 to 51 µV/K | 16 to 21.8 mV | Low to moderate |
| S (Pt 10% Rh – Pt)<br>R (Pt 13% Rh – Pt)<br>B (Pt 30% Rh – Pt 6% Rh) | 8 to 11 µV/K | 0.9 to 3.4 mV | High |

HIGH COMMAND FIDELITY ELECTROMAGNETICALLY DRIVEN CALORIMETER

CROSS REFERENCE TO RELATED APPLICATION

This application claims the benefit of U.S. Provisional Appl. No. 62/382,361, filed Sep. 1, 2016. The above application is hereby incorporated by reference in its entirety.

ACKNOWLEDGMENT OF GOVERNMENT SUPPORT

This invention was made with government support under DE-AC05-00OR22725 and DE-AC02-07CH11358 awarded by the Department of Energy. The government has certain rights in this invention.

FIELD

The present disclosure relates to calorimeters, and to methods and apparatuses for calorimeters.

BACKGROUND

Calorimeters can measure thermophysical properties of samples such as heat capacity and enthalpy. Calorimeters can apply heat to a sample and a reference and measure temperature differences between them. If the reference used has known thermal properties, then thermal properties of the sample can be deduced based on the temperature differences measured between the sample and the reference.

One thermoanalytical technique that can be used by a calorimeter is differential scanning calorimetry (DSC). In DSC, the temperature of the sample and the reference is linearly increased over time and the amount of heat required to keep the sample and the reference at the same temperature is measured. Another thermoanalytical technique that can be used by a calorimeter is differential thermal analysis (DTA). In DTA, a constant heat flow is applied to the sample and the reference and the temperature difference arising between the sample and the reference due to the applied heat flow is measured.

SUMMARY

Embodiments of an electromagnetically driven calorimeter with an induction heating source are disclosed herein.

In one representative embodiment, an apparatus can comprise an emitter to emit radio frequency radiation, an absorber that changes temperature based on emissions from the emitter, and one or more sensors to measure a temperature difference between a sample and a reference coupled to the absorber.

In some embodiments, the emitter can be configured to heat the absorber at a rate greater than 50 degrees Celsius per minute.

In some embodiments, the radio frequency radiation can have a frequency less than 300 MHz.

In some embodiments, the emitter can be a water cooled coil.

In some embodiments, the absorber can be positioned within the induction coil.

In some embodiments, the absorber can comprise a first tubular portion, a second tubular portion positioned within the first tubular portion, and a third tubular portion positioned within the second tubular portion.

In some embodiments, the first tubular portion can comprise a material having a relatively low thermal conductivity and relatively low electromagnetic absorption.

In some embodiments, the first tubular portion can comprise fused quartz or silica.

In some embodiments, the second tubular portion can comprise a material having relatively high thermal conductivity and relatively high electromagnetic absorption.

In some embodiments, the second tubular portion can comprise graphite.

In some embodiments, the third tubular portion can comprise a material having relatively low electromagnetic absorption.

In some embodiments, the third tubular portion can comprise alumina.

In some embodiments, a thermal insulator can be positioned annularly between the first tubular portion and the second tubular portion.

In some embodiments, the thermal insulator can comprise a ceramic felt.

In some embodiments, a conductive shield can be positioned annularly around the emitter to prevent electromagnetic radiation from passing therethrough.

In some embodiments, the one or more sensors can comprise one or more thermocouples.

In some embodiments, the apparatus can further comprise a signal processing module to process the output from the one or more thermocouples.

In another representative embodiment, an apparatus can comprise an emitter to emit electromagnetic radiation, an absorber that changes temperature based on emissions from the emitter, one or more thermocouples configured to measure a temperature difference between a sample and a reference coupled to the absorber, and a signal processing module to process the signal, wherein the signal processing module is configured to attenuate an alternating current portion of an output signal from the thermocouple by a factor of more than 100.

In another representative embodiment, a method can comprise exciting an induction coil with alternating current, wherein an absorber is positioned within the induction coil such that the temperature of the induction coil changes based on the alternating current, wherein a sample and a reference are coupled to the absorber, and wherein a thermocouple measures a temperature difference between the sample and the reference, passing the output from the thermocouple through an analogue low-pass filter, converting the output of the low-pass filter from analogue to digital, amplifying the converted digital signal, and filtering the amplified signal.

The foregoing and other objects, features, and advantages of the invention will become more apparent from the following detailed description, which proceeds with reference to the accompanying figures.

BRIEF DESCRIPTION OF THE DRAWINGS

FIG. 4 shows an example electromagnetically driven calorimeter in an unassembled state in accordance with the teachings of this disclosure.

FIG. 5 shows the calorimeter embodiment of FIG. 4 in a partially assembled state.

FIG. 6 shows a cross-sectional view of an embodiment of a furnace insert for the presently disclosed devices, such as the FIGS. 4 and 5 embodiments.

FIG. 7 shows an overhead view of an embodiment of a furnace insert for the presently disclosed devices, such as the FIGS. 4 and 5 embodiments.

FIG. 8 shows various exploded views of a sensor system embodiment of the presently disclosed devices, such as the FIGS. 4 and 5 embodiments.

FIGS. 9A-9D show the calorimeter embodiments of FIGS. 4 and 5 being inserted inside an embodiment of a superconducting magnet.

DETAILED DESCRIPTION

Figure 1:
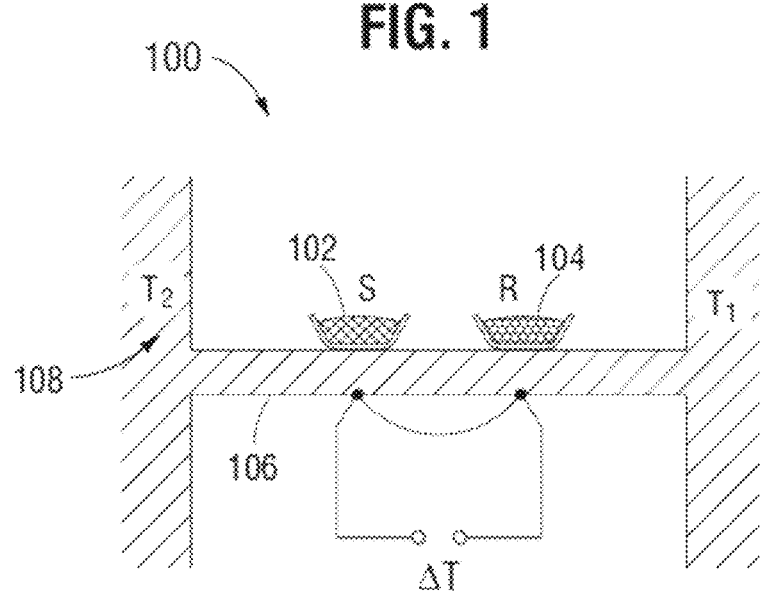
FIG. 1 shows a block diagram of an example calorimeter.

Calorimeters can be used to measure thermophysical properties of a sample. A calorimeter can consist of a sample and a reference that are both heated and/or cooled at a controlled rate, with temperature typically increasing or decreasing linearly. Temperature measurements can be taken as the sample and reference are heated and cooled over time and the resulting difference in temperature between the reference and the sample can be used along with known thermal properties of the reference to determine certain thermal properties of the sample. Calorimeters can operate using differential scanning calorimetry (DSC) or differential thermal analysis (DTA) technology.

The disclosed electromagnetically driven calorimeter can measure thermophysical properties of samples. Certain embodiments use a unique induction heating source that enables rapid heating rates. Certain embodiments of the disclosed calorimeter run in DSC mode and/or DTA mode. Certain embodiments of the disclosed calorimeter have an inherently low thermal mass and high power density compared to known calorimeters that use traditional resistive heating elements. As such, certain embodiments of the disclosed calorimeter are capable of enhanced temperature control not achievable using known technologies. In addition, certain embodiments of the disclosed calorimeter can achieve heating and cooling rates significantly greater than 100° C./min along with the ability to track transient heating rates with high fidelity while accurately measuring low signal voltages (e.g., less than 1 µV). Certain embodiments of the disclosed calorimeter are operable under high DC magnetic fields (e.g., greater than 2 Tesla) and high temperatures (e.g., greater than 1400° C.).

Embodiments of the disclosed calorimeter may take thermodynamic measurements in either DSC or DTA mode, wherein a sample and a reference are placed in a temperature controlled environment (e.g., a furnace) surrounded by a carrier gas. The carrier gas can assist the transfer of heat to and from the sample. In certain embodiments of the disclosed invention, the carrier gas can also provide a shielding atmosphere. Reactive atmospheres (e.g., atmospheres containing carbon dioxide, carbon monoxide, water vapor, hydrogen, and/or oxygen) that are required for the investigation of corrosion and solid state chemical synthesis reactions with gas phases can be measured by certain embodiments of the disclosed calorimeters using protected sensors such as thermocouples or other temperature sensing devices.

As the temperature of the furnace and the carrier gas is changed, a temperature difference can develop between the sample and the reference due to differences in heat capacity and during thermal events such as phase transformations that the sample undergoes. This temperature difference can be measured as a function of the sample's temperature. Both DSC and DTA configurations may be used to measure enthalpic changes in the sample. However, in a DSC configuration, thermal properties of the reference (e.g., heat capacity, enthalpy of transformation) can be used to accurately measure the enthalpy change of the sample during a temperature sweep or during equilibration subsequent to a stepped temperature excitation.

FIG. 1 shows a schematic representation of an example calorimeter 100. The calorimeter 100 comprises a sample 102, whose thermal characteristics are to be measured, and a reference 104 with known thermal characteristics. The sample 102 and the reference 104 can be placed on a heat flow plate 106 inside of a furnace 108. The sample 102 and the reference 104 can be surrounded by a carrier gas.

Heat can be transferred into the sample 102 and the reference 104 by a variety of means. Heat can be transferred to the sample 102 and the reference 104 via the carrier gas based on the thermal conductivity of the carrier gas. Heat flow can also occur between the sample 102 and the reference 104 through the heat flow plate 106 and through radiation at a temperature above 800° C. This is referred to as cross talk between the sample 102 and the reference 104. The thermal link between the sample 102 and the reference 104 can affect the design of a DSC or DTA based calorimeter.

Specifically, the sensitivity of measurement is directly proportional to the temperature difference that develops between the sample 102 and the reference 104. The temperature resolution, on the other hand, is linked to the thermal lag, or the time required to transfer heat between the sample 102 and the reference 104. The thermal link between the sample 102 and the reference 104 enables a more accurate evaluation of enthalpy but diminishes the temperature difference between the sample 102 and the reference 104, thereby decreasing the sensitivity of the calorimeter 100. When designing the calorimeter 100, a compromise must be made between thermal lag and sensitivity.

Figure 2:
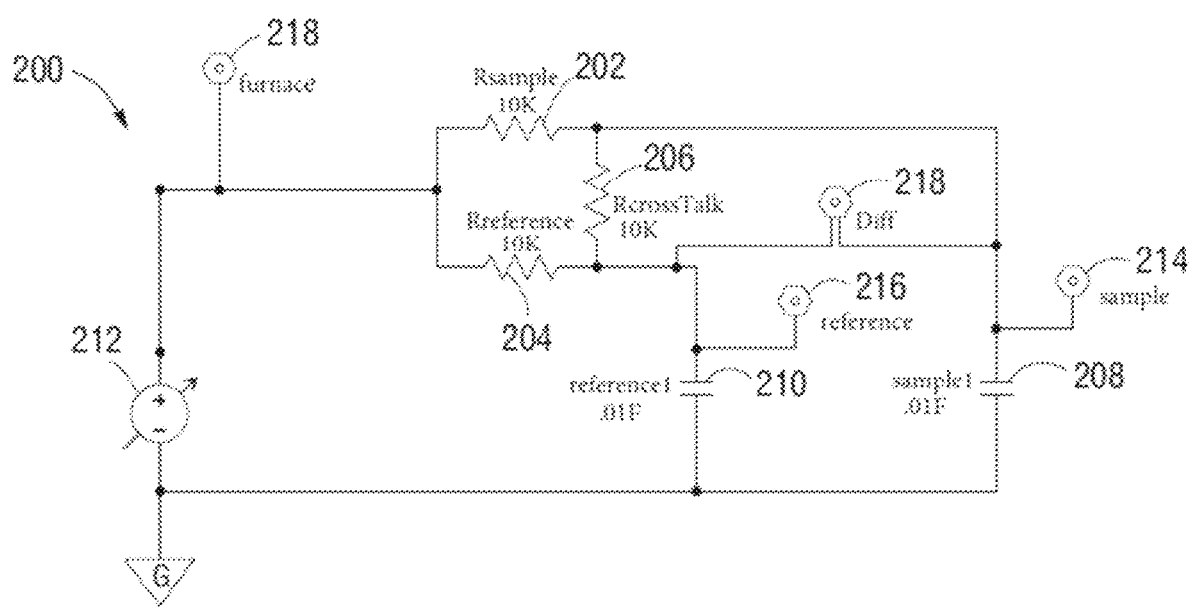
FIG. 2 shows a block diagram of an electrical circuit representation of the calorimeter of FIG. 1.

Thermal analysis equipment can be modeled with equivalent electrical circuits that can be used for simulations. In these types of models, temperature is equivalent to voltage and heat flow is equivalent to current. FIG. 2 shows an equivalent circuit 200 for the calorimeter 100 of FIG. 1. In the illustrated example of FIG. 2, thermal conduction between the carrier gas and the sample 102 is modeled by resistor 202 and thermal conduction between the carrier gas and the reference 104 is modeled by resistor 204. Thermal conduction between the sample 102 and the reference 104 is modeled by resistor 206. The heat capacities of the sample 102 and the referenced 104 are modeled by capacitors 208, 210, respectively. The furnace temperature is modeled by voltage supply 212. The temperature of the sample 102, the reference 104, and the furnace 106 correspond to voltages in FIG. 2, which are measured by voltage leads 214, 216, 218 respectively. The temperature difference between the sample 102 and the reference 104, which corresponds to a voltage difference in FIG. 2, is measured by voltage lead 218.

Two simulations were performed on the electrical circuit model of FIG. 2 in order to investigate the effects of varying the thermal conductivity between the furnace 108 and the sample and reference 102, 104 of FIG. 1. In order to investigate this effect, the resistance values of resistor 202 and resistor 204 of FIG. 2, which correspond to the conduction between the furnace 108 and the sample 102 and the reference 104.

For the first simulation, a value of 10,000 Ohms was used for resistors 202, 204 and for the second simulation, a value of 1,000 Ohms was used for resistors 202, 204. The 10,000 Ohm resistance was used to model a low conductivity carrier gas and the 1,000 Ohm was used to model a high conductivity carrier gas. The voltage 212, which corresponds to furnace temperature in FIG. 1, was increased at a constant rate and the voltage difference 218, corresponding to a temperature difference between the sample and reference 102, 104 in FIG. 1 was measured as a function of time. The results of this simulation are shown in FIG. 3.

Figure 3:
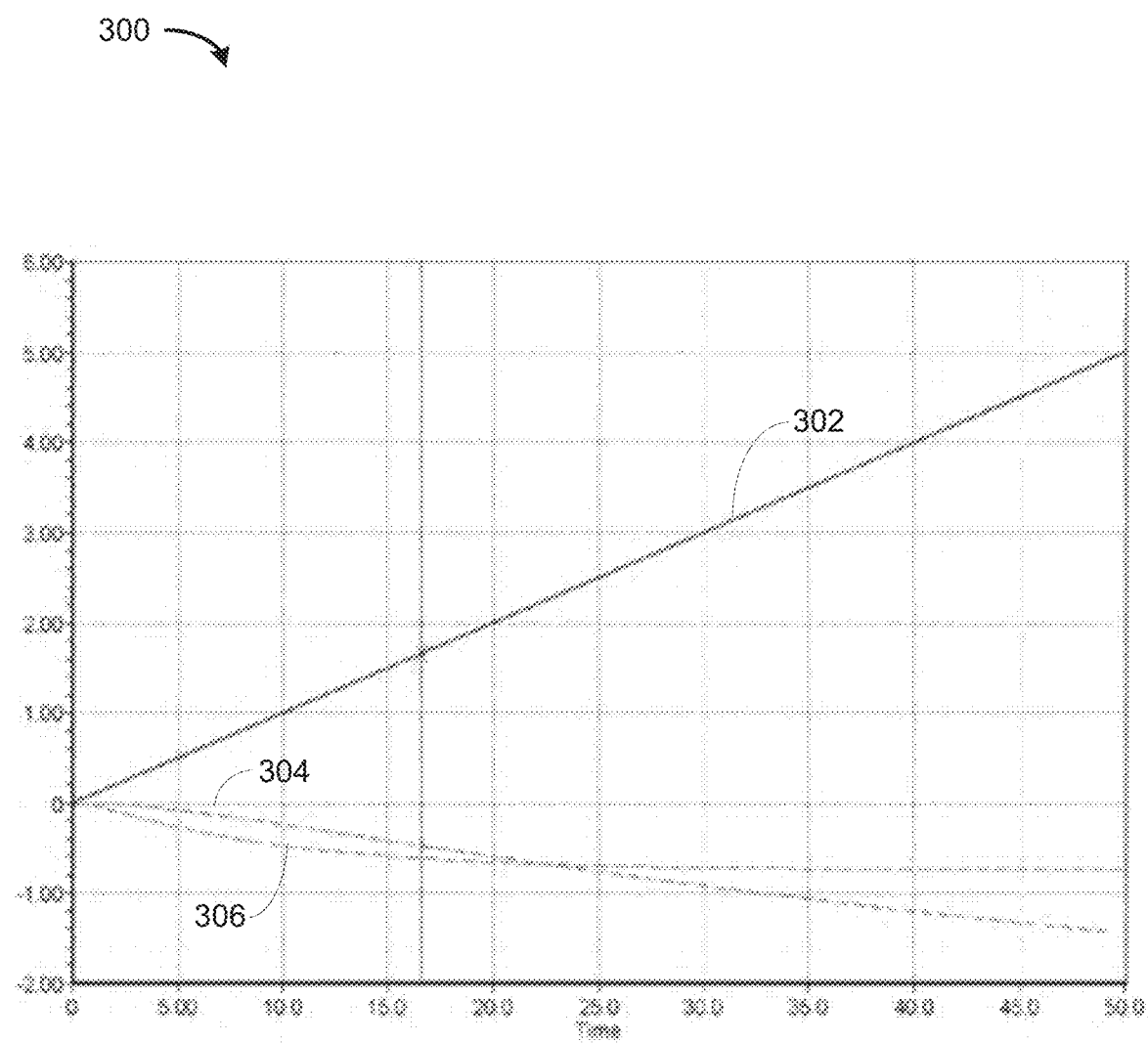
FIG. 3 shows a simulation of a DTA mode calorimeter showing the response of the system to high and low conductivity carrier gasses.

Chart 300 in FIG. 3 shows temperature as a function of time as measured by the simulation of the electrical circuit 200 discussed above. Curve 302 shows the temperature at the furnace over time, which increases linearly. Curve 304 shows the temperature difference between the sample 102 and the reference 104 of FIG. 1 when using a low conductivity carrier gas and curve 306 shows this temperature difference when using a high conductivity carrier gas. Comparison of curves 304, 306 reveals that the high conductivity carrier gas results in higher temporal resolution since curve 306 develops a greater temperature difference as the furnace 108 initially starts to increase in temperature. However, after approximately 23 seconds, the temperature difference in the low conductivity carrier gas simulation surpasses the temperature difference for the high conductivity carrier gas simulation. Therefore, the low conductivity gas has higher sensitivity. This type of analysis and consideration of different possible carrier gases is important when interpreting data from a calorimeter such as calorimeter 100 of FIG. 1.

FIG. 4 shows an exemplary electromagnetically driven calorimeter 400 with its various components unassembled. (FIG. 5 shows the calorimeter 400 in a partially assembled state.) The calorimeter 400 comprises a conductive shielding insert 402, an AC field insert 404, a furnace insert 406, and a sensor system 408.

An embodiment of the AC field insert 404 comprises an inductive coil 410 connected to electrical leads 412. The electrical leads 412 can be connected to an electrical power source such that an alternating current is passed through the inductive coil 410. When an alternating current is passed through the inductive coil 410, the coil 410 acts as an emitter such that electromagnetic energy is generated within the center of the coil. For example, an alternating current of up to 500 Amps with a frequency between 100-400 kHz can be passed through the inductive coil 410 to generate up to 9 kW of electromagnetic energy within the center of the coil. In some examples, the inductive coil 410 is a water cooled induction coil, wherein the coil is internally hollow and the internal hollow portion of the coil is filled with water in order to prevent the inductive coil 410 from excessive heating. In some examples, other emitters can be used other than an induction coil to generate electromagnetic energy.

Certain embodiments of the shielding insert 402 comprise a tubular housing with a thick outer annular surface having a diameter greater than 100 times the skin depth at the operating frequency of the calorimeter 400. When assembled for operation, the AC field insert 404 is placed inside the shielding insert 402. Thus, the shielding insert 402 protects the other components of the calorimeter 400 from external electromagnetic energy and permits sensitive electrical measurements when the calorimeter 400 is used in environments where high electromagnetic energy is present.

An embodiment of the furnace insert 406 can be inserted into the AC field insert 404 and can act as an absorber to convert the electromagnetic energy generated by the induction coil 410 into heat. FIG. 6 shows a cross-sectional view of the furnace insert 406 and FIG. 7 shows an overhead view of the furnace insert 406. The AC field insert 404 can comprise multiple layers.

The internal layer of the furnace insert 406 may include an insulating tube or tubular portion 414. The insulating tube 414 can be electrically insulating (i.e., it has relatively low electromagnetic absorption) and can have high thermal conductivity (i.e., it transmits heat well to the sensor system 408). The insulating tube 414 can ensure uniform or substantially uniform distribution of heat and lamellar gas flow around a sample and sensor system inside the insulating tube while protecting the sample from contact with conductive materials. The insulating tube 414 may be comprised of, consist essentially of or consist of silica, alumina, or other electrically insulating materials and/or any combination thereof.

The insulating tube 414 can be surrounded by a tightly fitting susceptor 416. The susceptor 416 can have a tubular shape. Under RF power, the resonant system of the AC field insert 404 can electromagnetically couple to the susceptor 416, thereby inducing a current in the susceptor resulting in resistive heating of the susceptor. Heat can be transferred from the susceptor 416 to the insulating tube 414 to heat a sample in the insulating tube radiatively and by conduction through a carrier gas. Example materials that can comprise the susceptor 416 are graphite, stainless steel, titanium, an Inconel or other materials that are susceptible to electromagnetic energy. The susceptor 416 can have high thermal conductivity and relatively high electromagnetic absorption.

The susceptor 416 may be surrounded by an electrically resistive thermal insulator 418 that can have a tubular shape. The thermal insulator 418 is typically a ceramic felt or other refractory fabric. The thermal insulator 418 can prevent the outermost layer 420 from excessive heating, such as exceeding 1000° Celsius.

In certain embodiments the outermost layer 420 of the furnace insert 406 comprises an RF transparent vacuum tube with low thermal conductivity (e.g., a thermal conductivity of 5 W/m/K or less). The outermost layer 420 may comprise, consist essentially of or consist of fused quartz, silica, alumina, other glass or ceramic materials, or any combination or mixture thereof. This outer layer 420 can allow the electromagnetic energy generated by the induction coil 410 to pass through. The outer layer 420 can be sealed with gas connections so that it can be evacuated and purged with flowing inert of reactive gas.

The sensor system 408 can be placed inside the furnace insert 406. The sensor system 408 can comprise a location to place a sample and a reference, such as sample 102 and reference 104 of FIG. 1, as well as one or more sensors to measure temperature or other properties and a data acquisition system. In the illustrated example of FIG. 4, the sensors of the sensor system 408 comprise three thermocouple. In other examples, the sensor system 408 can include other sensors in addition or in lieu or thermocouples. In alternative examples, the sample can be directly heated by various frequency range electromagnetic energy sources. In these alternative examples, energy can be transferred to conductive samples by RF stimulated resistive heating or microwave induced dipole polarization losses.

In the illustrated example of FIG. 4, one of the three thermocouples measures the temperature of the sample placed in the sensor system and one of the thermocouples measures the difference in temperature between the sample and a reference placed in the sensor system. The other thermocouple in the illustrated example is situated adjacent to the sample (e.g., within one inch) and can provide input for a feedback control system that maintains the temperature of the furnace insert 406 independent of enthalpic contributions from the sample and the reference.

The output of each of these thermocouples is a voltage proportional to the temperature being measured. Because the sensor system 408 is positioned within the center of the induction coil 410, the electromagnetic energy generated by the induction coil 410 causes an AC voltage to be superimposed on the DC voltage output of the thermocouples. To accurately read the temperatures measured by the thermocouples, their voltage output should be filtered to remove this AC component. An embodiment of a filtering technique used in illustrated examples is discussed below in connection with FIGS. 10-15.

FIG. 8 shows various exploded views of the sensor system 408. The sensor system 408 can include a sensor or sensors 450 (e.g., one or more thermocouples). The sensor top of the sensor system can include a gas connection 452 through which a purge and exchange gas can flow. The sensor system 408 can also include an electrical feedthrough 454 through which sensor signals can be fed to instrumentation. The sensor system 408 can further include a rod 456 to hold the sensor 450 in place at the center of the heating zone in the insulating tube 414 and at the center of a magnetic field when a magnetic field is applied during measurement. In the illustrated example, the wires that carry the signals from the sensor 450 are passed through the rod 456. In other examples, these wires can be outside the rod 456.

FIG. 9A shows the calorimeter 400 being inserted inside superconducting magnet 500. The calorimeter 400 is specifically designed to be operable in extreme environments such as in the presence of high magnetic fields, dynamic and standing wave environments, and plasma environments due to the unique electromagnetically driven furnace, the various shielding components of the disclosed calorimeter, and the use of non-magnetic materials for the internal components. FIGS. 9B and 9C show exploded views of the induction coil 410. FIG. 9C shows a refractory brick material that can insulate the outside of the induction coil 410 to prevent excessive heating of the materials surrounding the induction coil.

As explained above, in the illustrated example of FIG. 4, the output of the sensor system 408 of the calorimeter 400 comprises voltage outputs from three thermocouples. Because the voltage output of a thermocouple is relatively low (e.g., millivolts), measurements from a thermocouple are especially subject to electrical noise contamination from nearby electromagnetic sources. The output from a thermocouple is essentially a DC voltage generated by the Seebeck effect. Contamination of the temperature indicating DC voltage output of a thermocouple can be caused by other DC voltages generated by the inadvertent creation of additional metallic junctions along the signal path and by AC voltages induced from external sources such as an induction power supply. In calorimeters heated by induction systems, AC voltage contamination appears to be particularly problematic.

Figures 27, 28:
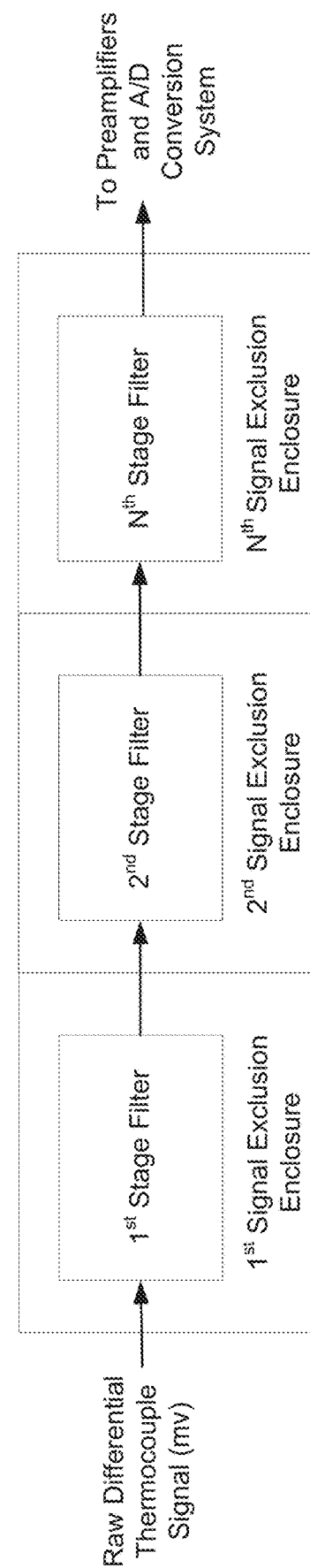
FIG. 27 shows a table comparing voltage outputs of several standardized thermocouple types.
FIG. 28 shows a block diagram of a two stage concatenated filter.

It is desirable to obtain the largest signal-to-noise ratio possible, however the small magnitude output of a thermocouple can require large amplification gains and high noise rejection to achieve a desirable signal-to-noise ratio. FIG. 27 shows a table comparing the output voltage ranges of several conventional thermocouple types at 400° C. The precious metal thermocouple types (e.g., S, R, and B) are particularly vulnerable to signal noise contamination. These low amplitude signals require higher gain, precision, and stability in the signal amplification electronics.

In a high magnetic field environment, thermocouples fabricated using magnetically susceptible materials exhibit a significant deviation from their acceptable transfer function because of a shift in Seebeck coefficient. Induction heating generates substantial EMI that directly contaminates thermocouple signals. Induction heating power supplies operate with resonant tank circuits driven by pulse-width modulation. Power supplies range in power capability to several tens of kilowatts for these DSC/DTA systems. These supplies generate noise and disruptive signals that can render many data acquisition and control systems useless unless protection from filtering and good grounding practice is followed. Typical induction-heating power supply operating frequencies range from 1 kHz to 1 MHz with noise and harmonics generated across the spectrum to tens of MHz.

Analog electronic circuits at the signal input points are particularly susceptible to radio frequency interference and EMI. This susceptibility occurs when the coupled RFI/EMI signal is rectified (envelope demodulated) by non-linear junctions at the first stage of semiconductors employed in a data acquisition system. Because of the demodulation effect, these circuits present a noise-derived signal that is in the same frequency band (at or near DC) as the thermocouple signals of interest. Such contamination cannot be removed by subsequent software filtering.

A filter can be constructed as described herein. In certain embodiments the topology is that of a multistage filter having concatenated isolated compartments, which function as independent Faraday cages around the noise filter components. As an example, FIG. 28 shows a block diagram of a filter system consisting of two stages plus additional stages (nth stage) as needed for increased noise rejection. The input signal is typically a low voltage signal from a type S, R, or B thermocouple. The output of a first stage filter circuit connects to an input of a second stage filter circuit, and likewise for n stages, thus forming a cascade. The first filter stage circuit is contained within the first signal exclusion enclosure, similarly for subsequent stages. The exclusion enclosure completely or substantially completely contains circulating noise currents and blocks or substantially blocks electrostatic field emissions, thereby preventing or substantially preventing coupling of noise signals to downstream filter stages. The only high-frequency noise or the only substantial high-frequency noise that is passed along is the highly attenuated fraction leaving the filter stage through the normal forward path.

Figure 29:
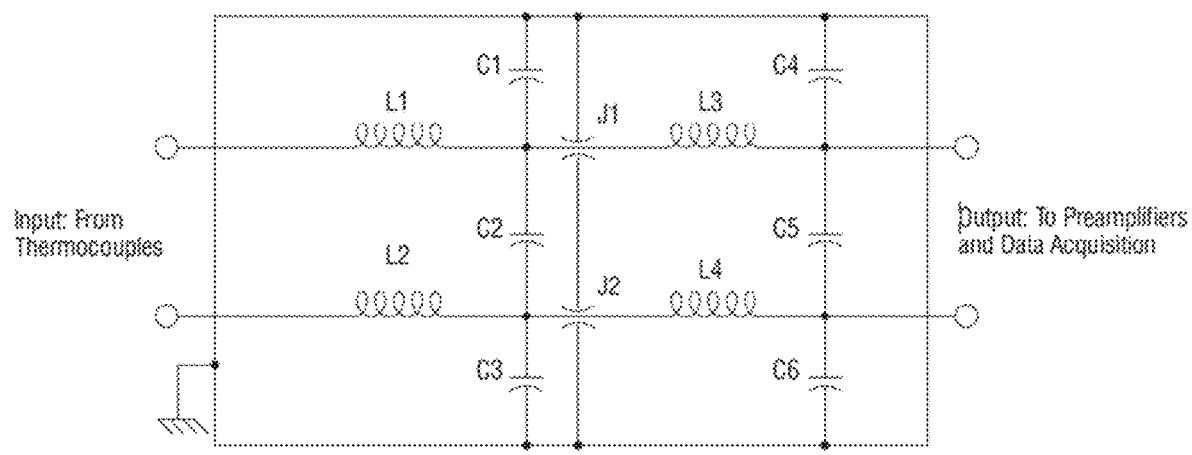
FIG. 29 shows example internal components of the two stage filter of FIG. 28.

Filter components can consist of inductors and capacitors for which, as mentioned above, attention is paid to containing stray magnetic and electrostatic emissions so that unwanted signals are not inadvertently coupled forward to downstream components and therefore into the signal of interest. As an example, FIG. 29 shows a filter device having two inputs, which constitute a differential signal pair from the thermocouple (or back-to-back thermocouples forming a differential pair as is often used in a calorimeter). Input inductor L1 is in series with one input and inductor L2 is in series with the other input. Capacitor C2 is applied differentially across the inductors to form a low-pass filter. Capacitors C1 and C3 are applied in common mode between ground and signal. The inductor-capacitor combinations form low-pass filters with a first filtered output appearing at the node inputs to feedthrough capacitors J1 and J2, respectively.

The feedthrough capacitors penetrate the barrier between the first exclusion enclosure and the second enclosure. Inductors L3 and L4 and capacitors C4, C5, and C6 form a second stage differential low-pass filter analogous to the first stage. Capacitor C5 provides a return path for differential mode currents and capacitors C4 and C6 provide the common-mode path. The filtered first stage output signal pair is provided to the next filter stage. Capacitors C1, C2, and C3 and inductors L1 and L2 form a first stage filter circuit and are contained within a first signal exclusion enclosure. Capacitors C4, C5, and C6 and inductors L3 and L4 form a second stage filter circuit and are contained within a second signal exclusion enclosure. Other combinations of common-mode and differential components are possible and can be implemented using this basic concept by those of ordinary skill in the art having the benefit of reading this disclosure.

Figure 30:
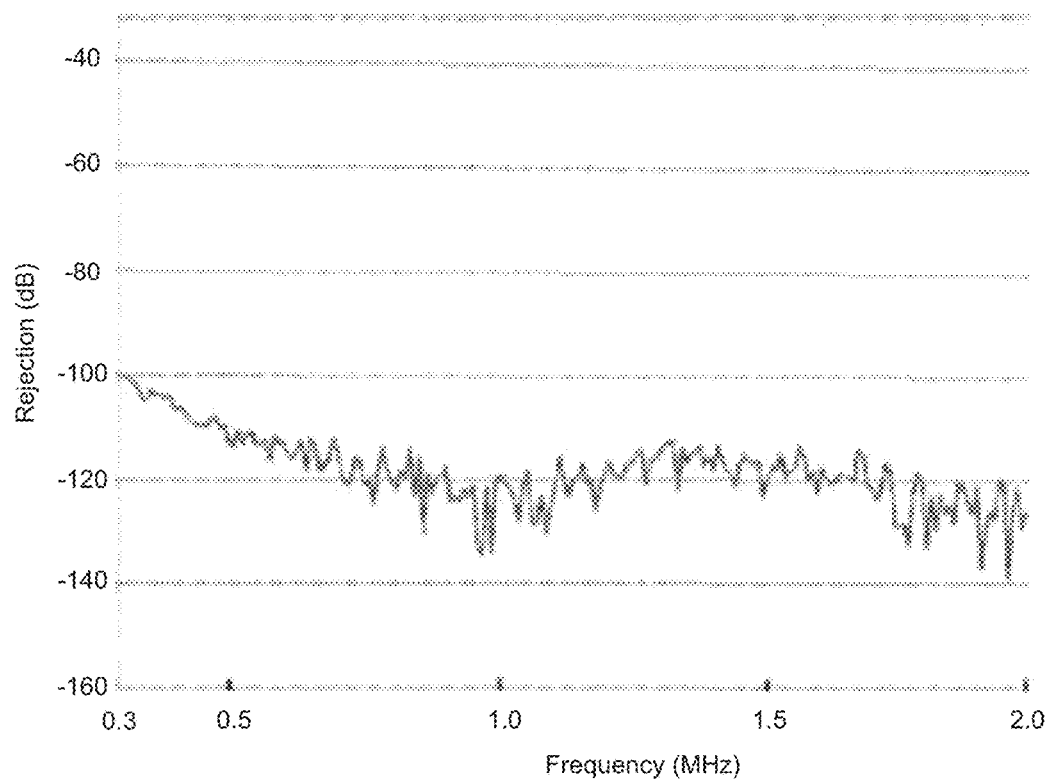
FIG. 30 shows a plot of typical high-frequency rejection measured with a two chamber device in a network analyzer.
Figure 31:
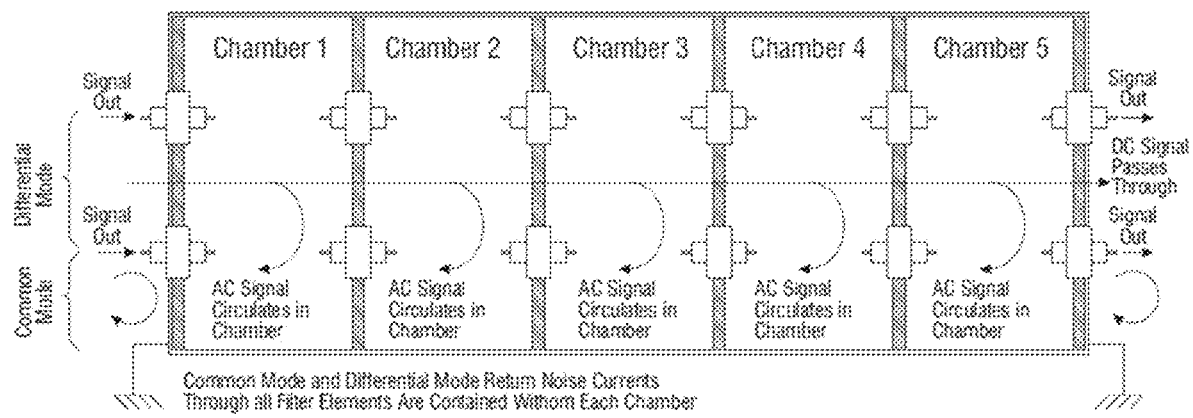
FIG. 31 shows an example five chamber implementation of a thermocouple noise filter.

These filters can be LC Butterworth designs and can be concatenated to form multiple stages. Depending on the selection of components and frequency range, different rejection rates are possible. For example, using a two-stage filter similar to that depicted in FIG. 29, inductors of about 5 mH and capacitors of about 1 µF provide over 100 dB of high-frequency noise rejection. FIG. 30 shows a typical high-frequency rejection measured with a two chamber device in a network analyzer. Additional high-frequency rejection is possible with more changers. FIG. 31 shows a five-chamber implementation of a thermocouple noise filter. Each stage can add 40 dB to 60 dB of rejection depending on the parameter selection.

Figure 32:
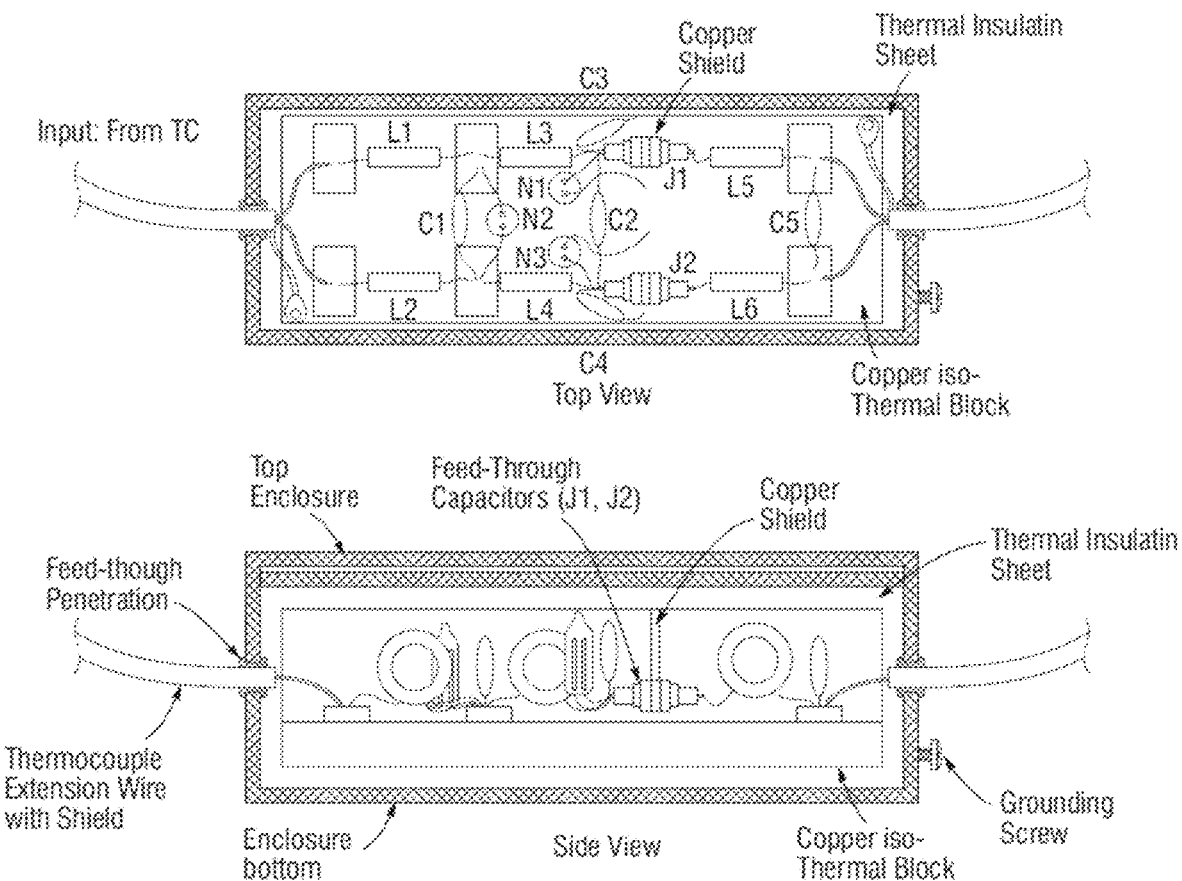
FIG. 32 shows a physical construction and layout of a two-chamber filter to maintain equal temperature from input to output.

In addition to the high-frequency noise rejection described above, a circuit can be constructed on a copper substrate and can be thermally insulated with high quality thermal insulation to keep all components in the filter at equal temperature. A consistent temperature is required to prevent small Seebeck voltages from developing within the filter components. Such a signal would add to the actual thermocouple signal and become an unwanted bias in the measured output. FIG. 32 shows a possible configuration of a two-chamber filter to maintain equal temperature from input to output. In addition to showing the copper substrate, voltage limiters in the form of gas discharge devices are shown in FIG. 32 as NE1, NE2, and NE3. These devices limit voltage excursions to less than 70 volts, which acts to protect the internal capacitors and to some extent the input stages of the data acquisition preamplifiers.

As mentioned above, signals from thermocouples are in the range of millivolts for types R, S, and B thermocouples. When two thermocouples are placed in an opposing differential mode so that the thermocouples becomes highly sensitive to minute differences in temperatures, the output voltage of the two thermocouples is in the range of microvolts. Microvolt and millivolt signals should be shielded and filtered to prevent or to substantially prevent contamination. Thermocouple signals preferably are routed through a hardware filter to reduce the various EMI/RFI components, which are not part of the thermocouple signal and can cause a detrimental response of the input stages of the data acquisition system. Filter types that can be implemented are Butterworth, Elliptical, Bessel, and multistage filters. These and other filter types can be implemented with passive components (e.g., inductors, capacitors, and resistors) by those of ordinary skill in the art having had the benefit of reading this disclosure.

Figure 33:
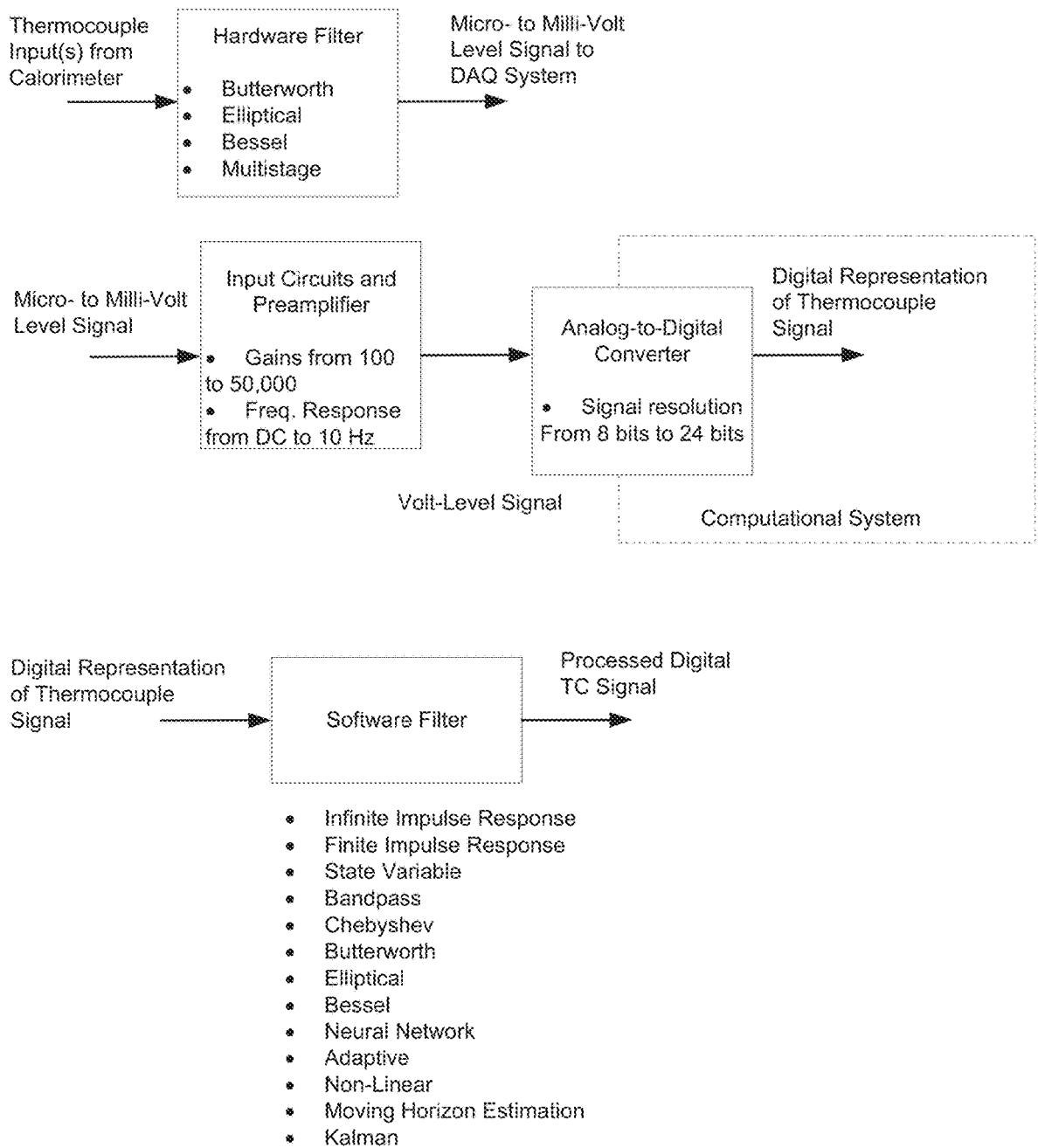
FIGS. 33-34 show block diagrams of the various filters that can be used to process the thermocouple voltage output from embodiments of the electromagnetically driven calorimeter disclosed herein.
Figure 34:
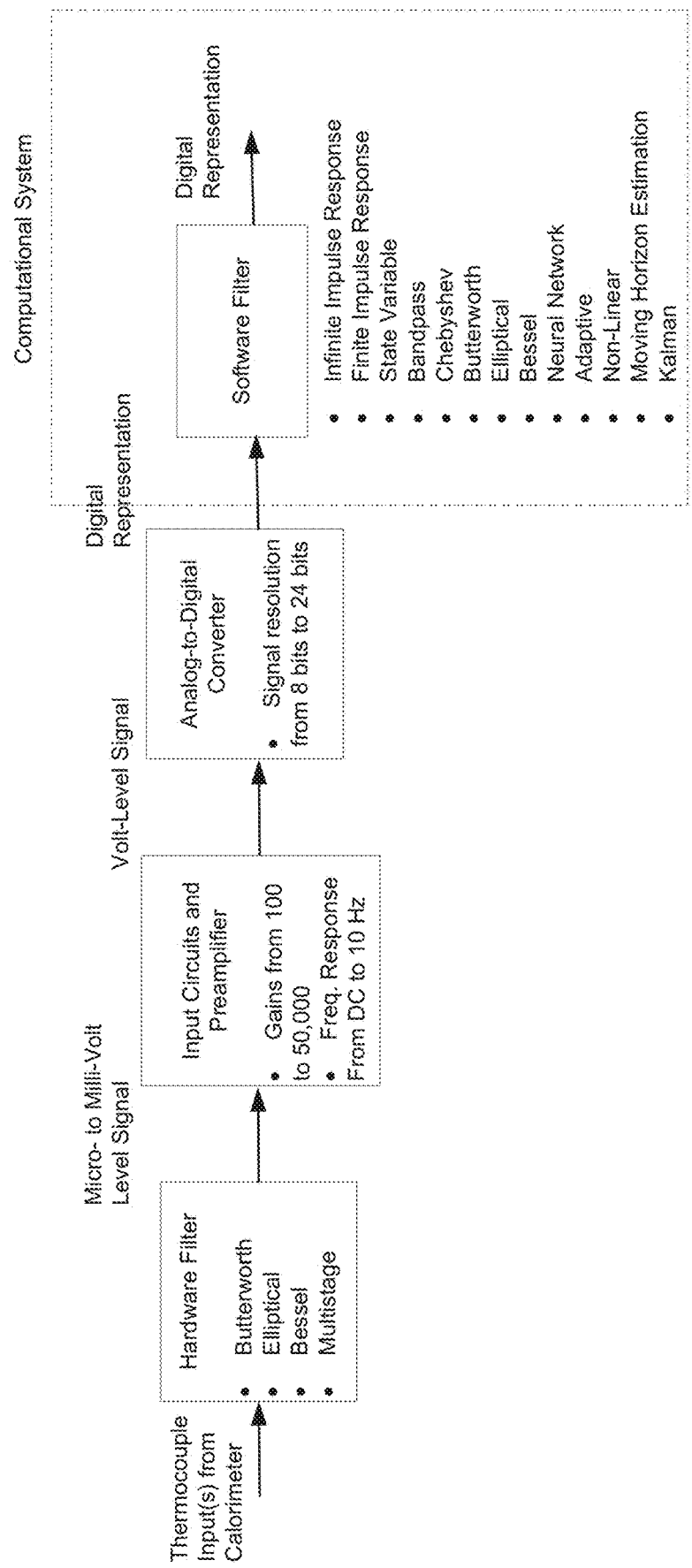

FIGS. 33 and 34 are block diagrams of filters and signal processing components that can make up a data acquisition system to receive and process thermocouple voltage outputs in the disclosed electromagnetically driven calorimeter. The data acquisition system of FIGS. 33 and 34 comprises a hardware filter, amplification preamplifier, an analog to digital converter and a software filter. The input circuits may have simple resistor-capacitor filters with a cutoff (i.e., −3 dB down points) at frequencies such as 5 Hz, 10 Hz, 20 Hz, and 40 Hz. There may also be more elaborate filters implemented by operational amplifiers just further downstream prior to the analog-to-digital converter. The preamplifiers pass the DC component of the thermocouple but filter the AC component, which is usually considered to be a result of the 50 Hz or 60 Hz line frequency because of the high gains required. The resulting amplified and filtered signal is then at a level of 100 mV to 1 V and suitable for passing to the analog-to-digital converter. The analog-to-digital converter translates the thermocouple output signal to a digital representation in the computation unit. This representation can range from 8 bits to 24 bits depending on the desired calorimeter resolution. Sampling rates are often selected based on the highest AC signals that are expected to be present in the amplified thermocouple signal.

The last component of FIGS. 33 and 34 shows additional software filtering that can be used to further remove contamination from the temperature measurement. Software representation can be more complex and elaborate than the hardware counterpart. Numerous methods can be applied alone or in combination with others by those of ordinary skill in the art having had the benefit of reading this disclosure. Filter methods can include, e.g., infinite impulse response, finite impulse response, state variable, bandpass, Chebychev, Butterworth, Elliptical, Bessel, neural networks, adaptive systems, non-linear factors, moving horizon, and Kalman filtering. The resulting temperature signal after proper processing is preferably stable and representative of the true measured temperature.

Figure 10:
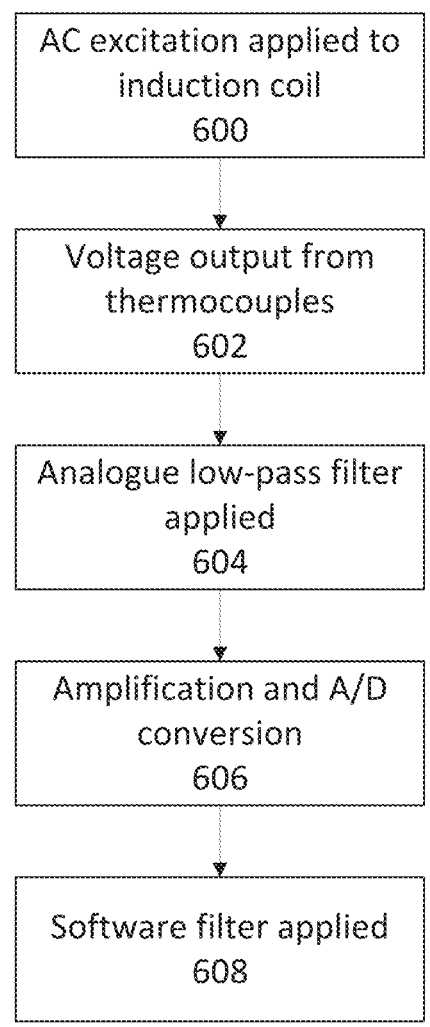
FIG. 10 shows a flow chart of signal processing operations that can be imposed on thermocouple output signals in embodiments of the disclosed calorimeter, such as the FIGS. 4 and 5 embodiments.
Figure 11:
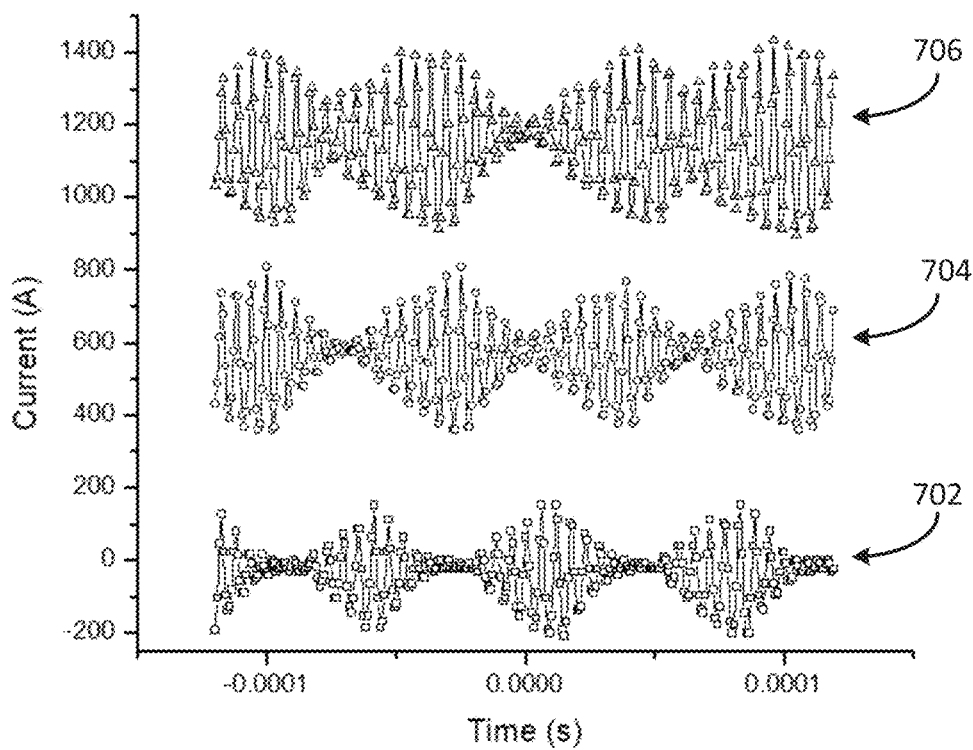
FIG. 11 shows AC current inputs to an induction coil embodiment in the disclosed calorimeter, such as those of FIGS. 4 and 5 for various power sources.

FIG. 10 shows a flowchart illustrating the various disclosed filtering processes discussed above that can be used to process the voltage outputs of thermocouples. FIG. 10 begins when an AC excitation is applied to induction coil 410 (block 600). FIG. 11 shows example AC currents applied to the induction coil 410 for three different example power sources. The data in group 702 was recorded from a power source of 717 W, the data in group 704 was recorded from a power source of 1474 W and the data in group 706 was recorded from a power source of 2506 W. For clarity, the plots in group 704 and 706 are offset vertically by 600 A and 1200 A, respectively. The applied AC current generally has two characteristic frequencies that result in an inner-modulated AC excitation current. The higher frequency modulation, typically greater than 100 kHz is a result of the natural resonant frequency of the RF resonant circuit. This component is typically inner-modulated with a frequency that is characteristic to the duty cycle control of the output power from a drive circuit. The resulting AC current causes the induction coil 410 to heat the furnace insert 406, which in turn heats the sample and the reference.

Figure 12:
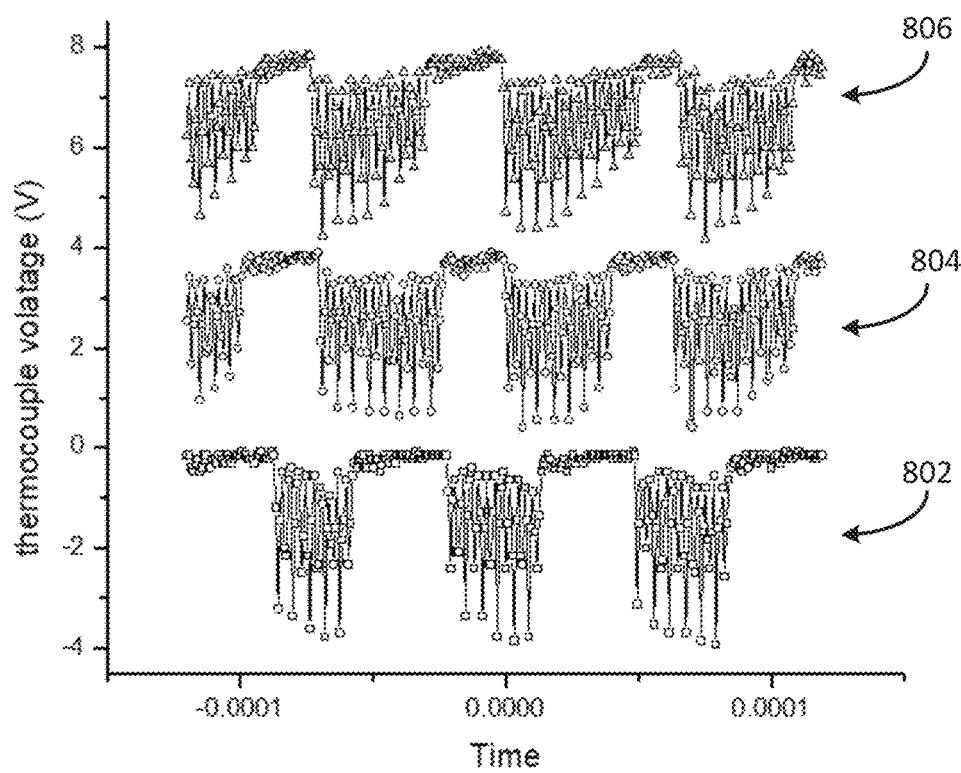
FIG. 12 shows DC voltage outputs from a thermocouple embodiment such as in the calorimeter of FIGS. 4 and 5 resulting from the AC current inputs of FIG. 11.

As the sample and reference are heated, thermocouples measured the resulting temperature changes. As explained above, the thermocouples output a DC voltage, which is superimposed on an AC voltage output caused by induced EMF from interactions with the RF field (block 602). FIG. 12 shows example voltage outputs from a thermocouple measuring the temperature of a sample when the AC excitation of FIG. 11 are applied to the induction coil 410. Voltage signals 802, 804, and 806 of FIG. 12 result from currents 702, 704, 706 of FIG. 11, respectively. For clarity, the plots in group 804 and 806 are offset vertically by 4V and 8V, respectively. As shown in FIG. 12, the voltage output may have a DC component and an AC component.

Figure 13:
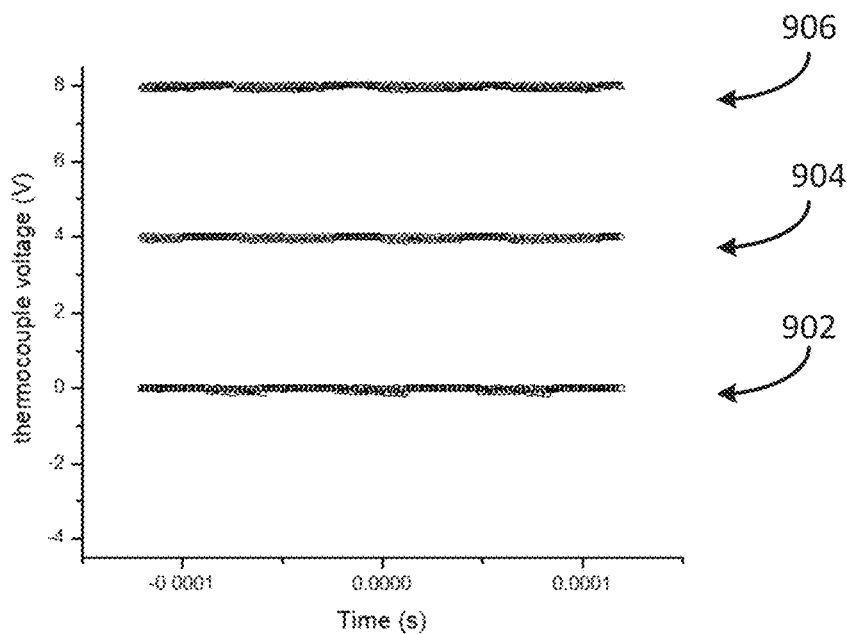
FIG. 13 shows the DC voltage outputs of FIG. 12 after being low pass filtered.

Referring again to FIG. 10, the voltage output from the thermocouples in the sensor system 408 is first passed through an analogue low-pass filter (block 604). In the illustrated example, an analog filter is used that reduces the intensity of the induced EMF by a factor greater than 10, resulting in a signal with a manageable DC signal to AC noise ratio. FIG. 13 shows example signals after the voltage output of the thermocouple measuring sample temperature is passed through an analog filter. Voltages 902, 904, and 906 are filtered versions of voltages 802, 804, and 806. The analog filter used can consist of a series of inductive elements with parallel capacitive elements configured to provide strong frequency dependent impedance. Solid state voltage regulation devices such as fast response Zener diodes can also be used to protect the sensor system 408 from voltage spikes above 5V. Such devices can also contribute to the general electrical safety of the calorimeter 400.

Figure 14:
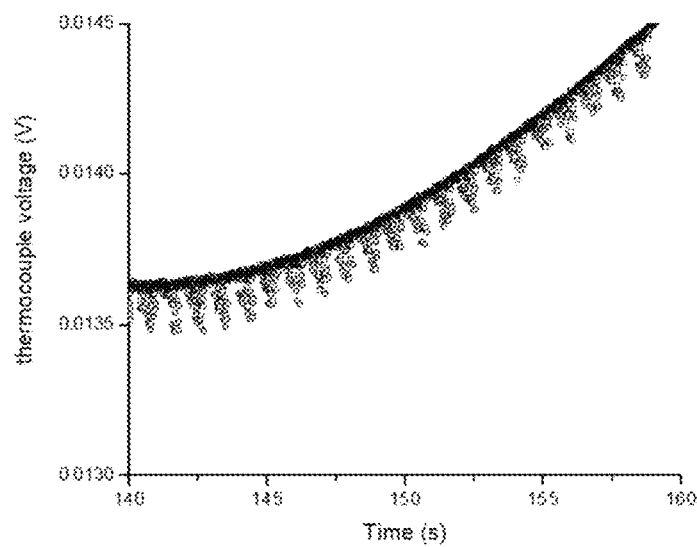
FIG. 14 shows a DC voltage output of FIG. 13 after being passed through an analog-to-digital converter.

Referring back to FIG. 10, after the thermocouple voltage output is passed through an along filter (block 604), the resulting signal is converted from an analog signal to a digital signal and amplified along with capacitive voltage regulation of the signal in order to make use of the maximum resolution of the digitizer. An example resulting digital signal is shown in FIG. 14, which is amplified and converted from voltage signal 806.

Figure 15:
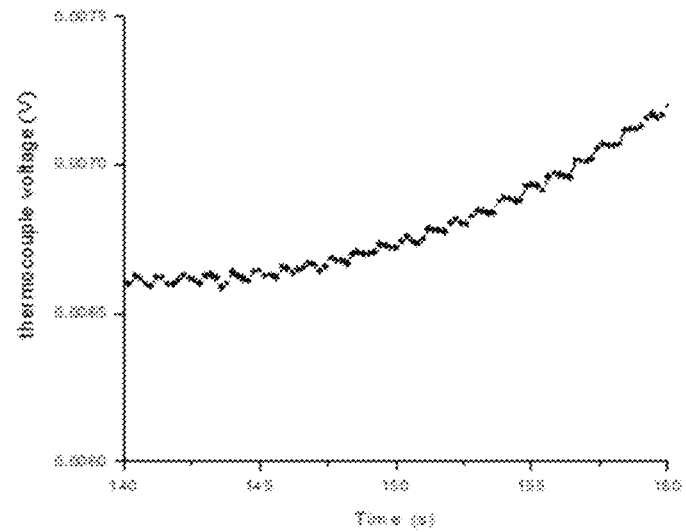
FIG. 15 shows the DC voltage output of FIG. 14 after passing through a software filter.

Lastly, the digital signal may be passed through a software filter. In the illustrated example, the software filter used is a high order Butterworth low-pass filter (e.g., greater than 4th order). In other examples, other types of software filters can be used. This filter can remove all or substantially all remaining high frequency noise. An example resulting signal is shown in FIG. 15, which is a software filtered version of FIG. 14.

Figure 16:
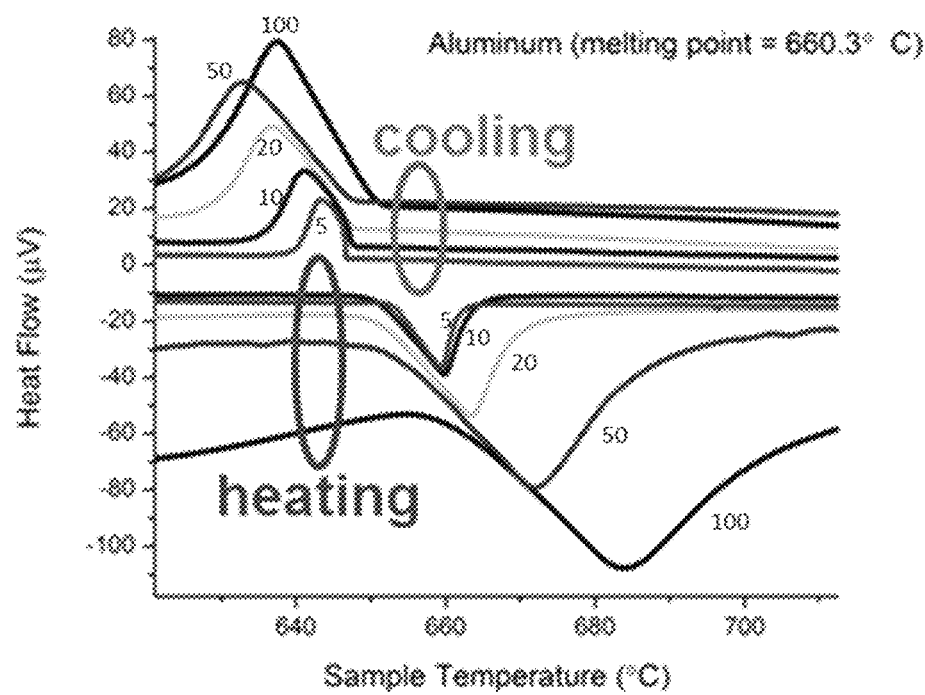
FIG. 16 shows differential thermocouple voltage signals for the melting and solidifying of aluminum using the example electromagnetically driven calorimeter disclosed herein.
Figure 17:
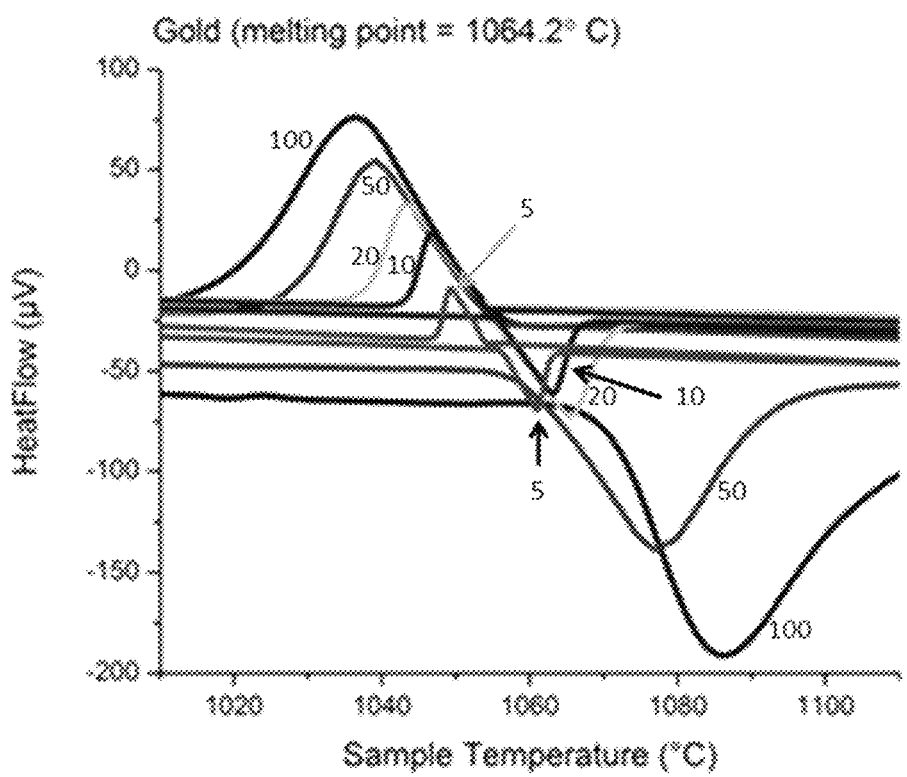
FIG. 17 shows differential thermocouple voltage signals for the melting and solidifying of gold using the example electromagnetically driven calorimeter disclosed herein.
Figure 20:
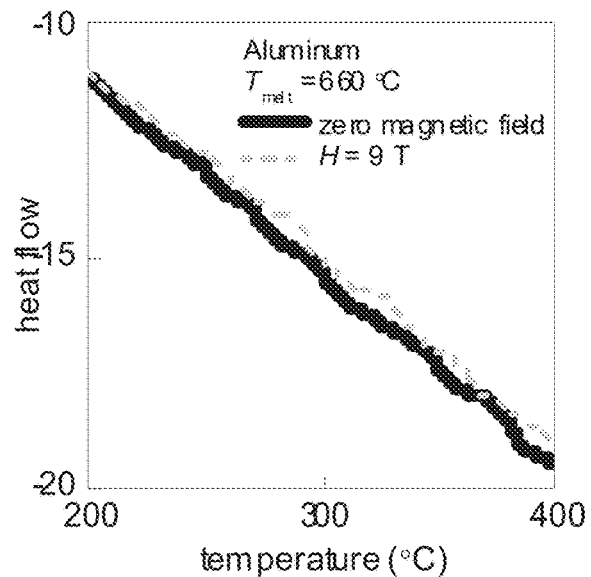

The performance of the example calorimeter 400 was verified by melting and solidifying two high purity samples of aluminum and gold with temperature scan rates of 5, 10, 20, 50 and 100° C./minute. FIGS. 16-17 show plots of the differential thermocouple voltage signal vs. sample temperature for each of these temperature scan rates. These results show that there is a noise free baseline (or substantially noise free, as illustrated in FIG. 20) that is maintained under high RF electromagnetic energy. The melting point of the samples is observed at temperatures that slightly increase with an increased scan rate due to thermal lag between the sample and the reference. The fact that the system tracks the predicted behavior under non-isothermal conditions shows that the example calorimeter 400 is effective at detecting enthalpic events under highly active electromagnetic sample environments.

Figure 18:
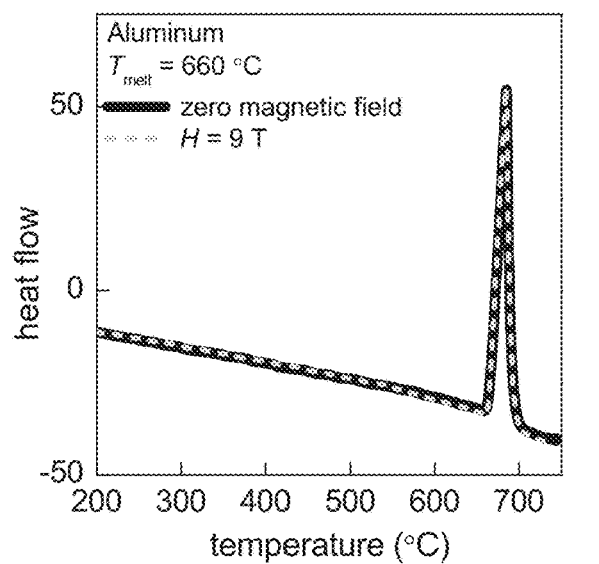
FIGS. 18-20 show plots of heat flow versus temperature for the melting of aluminum using the electromagnetically driven calorimeter disclosed herein under high magnetic field environments.
Figure 19:
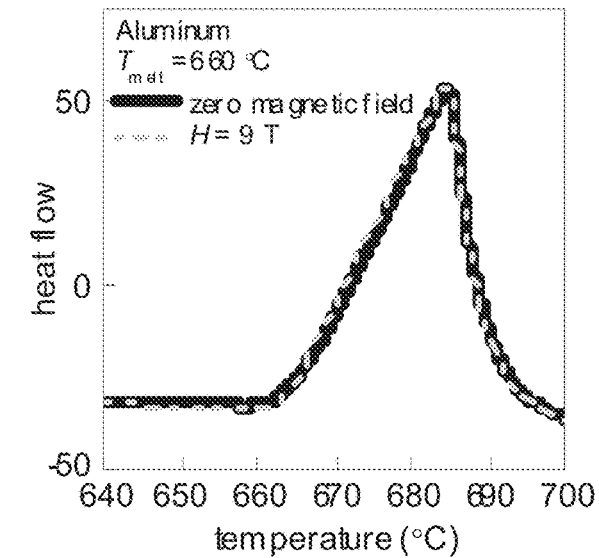

The example calorimeter 400 was also tested under high magnetic field environments generated by large bore superconducting magnets in the configuration shown in FIG. 9A. Samples of high purity aluminum were melted under 0 or 9 Tesla DC magnetic fields. The melting point of aluminum is not expected to be significantly affected by the large magnetic fields. These results are shown in FIGS. 18-20. As can be seen from these figures, there is virtually no difference in the measured results in the high magnetic field environment compared to an environment with no magnetic field. This shows that the calorimeter 400 can successfully operate in a high magnetic field environment.

Figure 21:
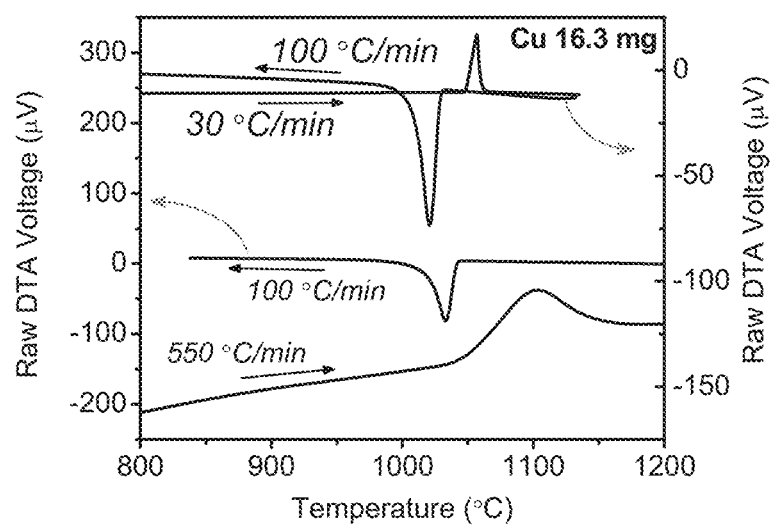
FIG. 21 shows a comparison of data from melting and freezing copper metal at different rates.
Figure 22:
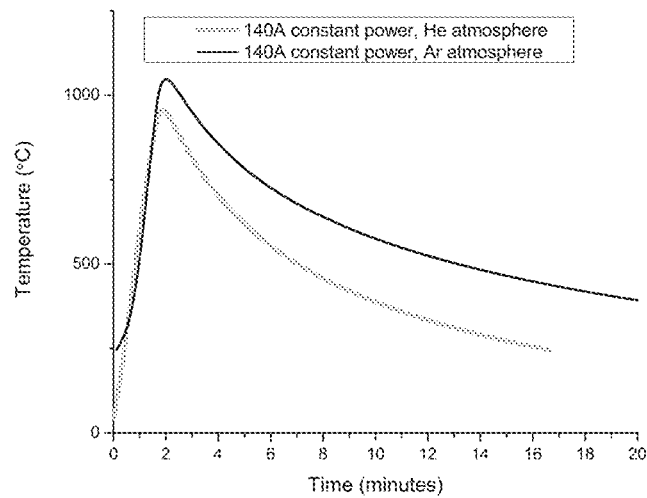
FIG. 22 shows a demonstration of heating with constant power and cooling with power off comparing argon and helium atmospheres.
Figure 23:
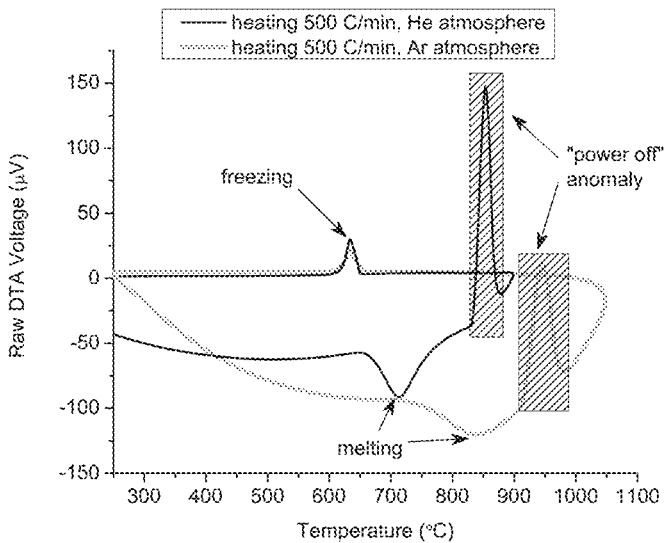
FIG. 23 shows a demonstration of improved melting peak sharpness and a reduction in overheating that occurs when a higher thermal conductivity gas, helium, is used compared to a lower thermal conductivity gas, argon, when heating at high rates.

Additional experimental data demonstrating the performance of the calorimeter 400 is shown in FIGS. 21-26. FIG. 21 shows thermocouple voltage output for the melting and freezing of copper metal at different temperature rates. FIG. 22 shows temperature results of heating with constant power and cooling with power of for an argon atmosphere and a helium atmosphere. FIGS. 21 and 22 demonstrate that high heating rates and high cooling rates can be achieved with the disclosed calorimeter 400. FIG. 23 shows a demonstration of the disclosed device's improved melting peak sharpness and reduction in overheating that occurs when a higher thermal conductivity helium gas is used as compared to a lower thermal conductivity argon gas when heating at high rates (e.g., 500° C./min).

Figure 24:
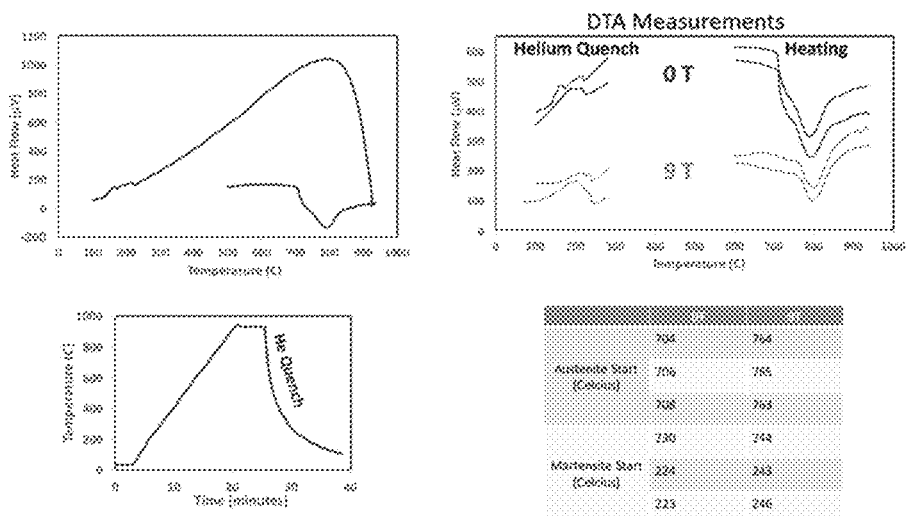
FIG. 24 shows a demonstration of high cooling rates enabled by the low thermal mass of embodiments of the disclosed furnace and measurement probe of certain embodiments of the electromagnetically driven calorimeter disclosed herein.
Figure 25:
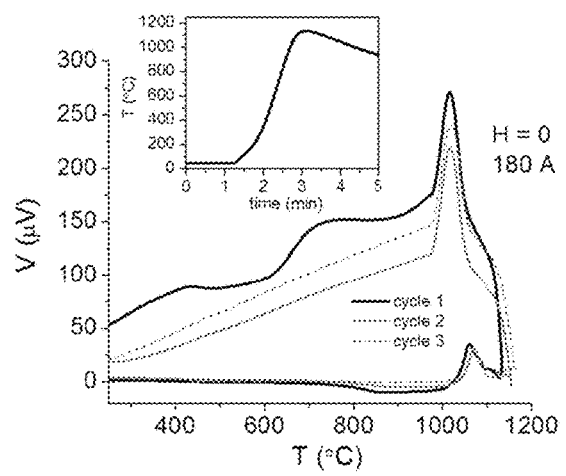
FIGS. 25-26 show plots of heating rates of amorphous Hf—Co—B using certain embodiments of the electromagnetically driven calorimeter disclosed herein.
Figure 26:
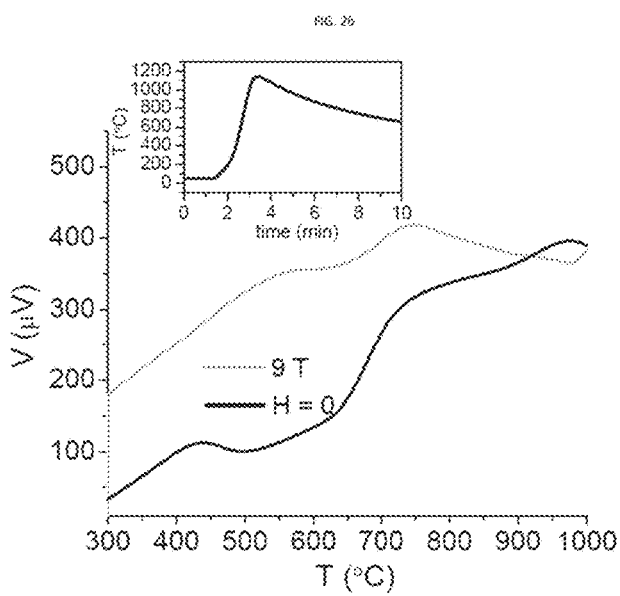

FIG. 24 shows a demonstration of high cooling rates enabled by the low thermal mass of the furnace and measurement probe and illustrates the effect of a high magnetic field on steel transformation temperatures. FIG. 24 demonstrates a subtle thermal anomaly observed during rapid cooling of steel. FIGS. 25-26 show various demonstrations of the high heating rates that can be achieved with the calorimeter 400. FIG. 25 shows another example of data collected at a high heating rate. In the example of FIG. 25, the temperature was cycled three times. FIG. 26 demonstrates a measurement conducted in the presence of a high magnetic field where the magnetic field has a strong effect on the thermal response of the sample.

General Considerations

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms may be high-level descriptions of the actual operations that are performed. The actual operations that correspond to these terms may vary depending on the particular implementation.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

As used herein, operations that occur "simultaneously" or "concurrently" occur generally at the same time as one another, although delays in the occurrence of one operation relative to the other due to, for example, spacing, play or backlash between components in a mechanical linkage such as threads, gears, etc., are expressly within the scope of the above terms, absent specific contrary language.

Unless otherwise indicated, all numbers expressing quantities of components, ranges, dimensions, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of determination under standard test conditions/methods as known to those of ordinary skill in the art. When directly and explicitly distinguishing embodiments from discussed prior art, the embodiment numbers are not approximates unless the word "about" is recited.

Although there are alternatives for various components, parameters, etc. set forth herein, that does not mean that those alternatives are necessarily equivalent and/or perform equally well. Nor does it mean that the alternatives are listed in a preferred order unless stated otherwise.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only preferred examples of the disclosed technology and should not be taken as limiting the scope of the disclosed technology. Rather, the scope of the disclosure is at least as broad as the following claims. We therefore claim all that comes within the scope of these claims.

We claim:

1. An apparatus comprising:
   an emitter to emit radio frequency radiation, the emitter comprising an induction coil;
   an absorber that changes temperature based on radio frequency radiation from the emitter, the absorber being positioned within the induction coil; and
   one or more sensors to measure a temperature difference between a sample and a reference coupled to the absorber.

2. The apparatus of claim 1, wherein the emitter is configured to heat the absorber at a rate greater than 50 degrees Celsius per minute.

3. The apparatus of claim 1, wherein the radio frequency radiation has a frequency less than 300 MHz.

4. The apparatus of claim 1, wherein the emitter is a water cooled induction coil.

5. The apparatus of claim 1, further comprising a conductive shield positioned annularly around the emitter to prevent electromagnetic radiation from passing therethrough.

6. The apparatus of claim 1, wherein the one or more sensors comprise one or more thermocouples.

7. The apparatus of claim 6, further comprising a signal processing module to process the output from the one or more thermocouples.

8. The apparatus of claim 1, wherein the absorber comprises a first tubular portion, a second tubular portion positioned within the first tubular portion, and a third tubular portion positioned within the second tubular portion.

9. The apparatus of claim 8, wherein the first tubular portion comprises a material having a relatively low thermal conductivity and relatively low electromagnetic absorption.

10. The apparatus of claim 8, wherein the first tubular portion comprises fused quartz or silica.

11. The apparatus of claim 8, wherein the second tubular portion comprises a material having relatively high thermal conductivity and relatively high electromagnetic absorption.

12. The apparatus of claim 8, wherein the second tubular portion comprises graphite.

13. The apparatus of claim 8, wherein the third tubular portion comprises a material having relatively low electromagnetic absorption.

14. The apparatus of claim 8, wherein the third tubular portion comprises alumina.

15. The apparatus of claim 8, wherein a thermal insulator is positioned annularly between the first tubular portion and the second tubular portion.

16. The apparatus of claim 15, wherein the thermal insulator comprises a ceramic felt.

17. An apparatus comprising:
an emitter to emit electromagnetic radiation;
an absorber that changes temperature based on electromagnetic radiation from the emitter;
one or more thermocouples configured to measure a temperature difference between a sample and a reference coupled to the absorber; and
a signal processing module configured to attenuate an alternating current portion of an output signal from the one or more thermocouples by a factor of more than 100.

18. The apparatus of claim 17, wherein the absorber comprises a first tubular portion, a second tubular portion positioned within the first tubular portion, and a third tubular portion positioned within the second tubular portion.

19. The apparatus of claim 17, wherein the emitter is an induction coil.

20. A method comprising:
exciting an induction coil emitter with alternating current such that the induction coil emitter emits radio frequency radiation, wherein an absorber is positioned within the induction coil emitter such that the temperature of the absorber changes based on the alternating current and the radio frequency radiation, wherein a sample and a reference are coupled to the absorber, and wherein a thermocouple measures a temperature difference between the sample and the reference;
passing an output from the thermocouple through an analogue low-pass filter;
converting an output of the low-pass filter from analogue to digital to obtain a converted digital signal;
amplifying the converted digital signal to obtain an amplified signal; and
filtering the amplified signal.

21. An apparatus, comprising:
an emitter to emit radio frequency radiation;
an absorber that changes temperature based on radio frequency radiation from the emitter; and
one or more sensors to measure a temperature difference between a sample and a reference coupled to the absorber;
wherein the absorber comprises a first tubular portion, a second tubular portion positioned within the first tubular portion, and a third tubular portion positioned within the second tubular portion.

\* \* \* \* \*

UNITED STATES PATENT AND TRADEMARK OFFICE
CERTIFICATE OF CORRECTION

PATENT NO. : 10,782,193 B2
APPLICATION NO. : 15/694708
DATED : September 22, 2020
INVENTOR(S) : Byvank et al.

Page 1 of 1

It is certified that error appears in the above-identified patent and that said Letters Patent is hereby corrected as shown below:

On the Title Page

Item (72) Inventors:
"Cajetan Ikenna Niebedim, Ames, IA (US)," should read --Cajetan Ikenna Nlebedim, Ames, IA (US)--.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*